(12) United States Patent
Vandewall et al.

(10) Patent No.: US 12,377,981 B2
(45) Date of Patent: Aug. 5, 2025

(54) SEATING SYSTEMS FOR AIRCRAFT AND METHODS OF ARRANGING SEATING SYSTEMS

(71) Applicant: The Boeing Company, Chicago, IL (US)

(72) Inventors: Cynthia Anne Vandewall, Snohomish, WA (US); Juan Sebastian Ramirez Loaiza, Cincinnati, OH (US); Jared Arthur Bowen, Snohomish, WA (US); Roshan Duggineni, Lousiville, KY (US); Alexis Rose Begnoche, San Francisco, CA (US); Craig M. Vogel, Cincinnati, OH (US); Matthew Anthony, Cincinnati, OH (US)

(73) Assignee: The Boeing Company, Arlington, VA (US)

( * ) Notice: Subject to any disclaimer, the term of this patent is extended or adjusted under 35 U.S.C. 154(b) by 593 days.

(21) Appl. No.: 17/681,467

(22) Filed: Feb. 25, 2022

(65) Prior Publication Data
US 2023/0271707 A1    Aug. 31, 2023

(51) Int. Cl.
*B64D 11/06* (2006.01)
*H01R 25/14* (2006.01)
(Continued)

(52) U.S. Cl.
CPC ...... *B64D 11/0624* (2014.12); *B64D 11/0696* (2013.01); *H01R 25/14* (2013.01);
(Continued)

(58) Field of Classification Search
CPC . B64D 11/0624; B64D 11/0696; B64D 11/06; H01R 25/14; H01R 25/16;
(Continued)

(56) References Cited

U.S. PATENT DOCUMENTS

2005/0215095 A1* 9/2005 Mitchell ............... B64D 11/06
439/110
2020/0194936 A1* 6/2020 Ricart ............... H01R 13/6315
(Continued)

*Primary Examiner* — Justin M Kratt
(74) *Attorney, Agent, or Firm* — Kolitch Romano Dascenzo Gates LLC

(57) ABSTRACT

The seating systems comprise a seat module and a seat track assembly comprising a plurality of seat-receiving regions, a seat track, and an electrical distribution system. The electrical distribution system comprises a plurality of track electrical contacts disposed along the seat track in the seat-receiving regions. The seat module comprises a base coupler configured to couple with the seat track at any seat-receiving region and a seat module electrical system having a seat electrical contact. The base coupler and the seat track are configured to position the seat electrical contact in connection with the track electrical contact of any seat-receiving region to which the base coupler is coupled. The methods comprise coupling the base coupler to a seat-receiving region, which comprises forming a connection between the seat electrical contact and the respective track electrical contact of the seat-receiving region, and providing electricity to the seat module via the electrical connection.

20 Claims, 10 Drawing Sheets

(51) Int. Cl.
*H01R 25/16* (2006.01)
*H01R 33/00* (2006.01)
*H01R 33/88* (2006.01)
*H01R 33/92* (2006.01)
*H02G 3/04* (2006.01)
*H01R 25/00* (2006.01)
*H01R 33/76* (2006.01)

(52) U.S. Cl.
CPC ........... *H01R 25/16* (2013.01); *H01R 25/162* (2013.01); *H01R 25/165* (2013.01); *H01R 33/00* (2013.01); *H01R 33/88* (2013.01); *H01R 33/92* (2013.01); *H02G 3/0437* (2013.01); *B64D 11/06* (2013.01); *H01R 25/00* (2013.01); *H01R 25/006* (2013.01); *H01R 33/76* (2013.01); *H01R 33/7671* (2013.01); *H01R 2201/26* (2013.01)

(58) Field of Classification Search
CPC .... H01R 25/162; H01R 25/165; H01R 33/00; H01R 33/88; H01R 33/92; H01R 25/00; H01R 25/006; H01R 33/76; H01R 33/7671; H01R 2201/26; H02G 3/0437
See application file for complete search history.

(56) References Cited

U.S. PATENT DOCUMENTS

| | | |
|---|---|---|
| 2020/0307417 A1 | 10/2020 | Ornan et al. |
| 2020/0307796 A1 | 10/2020 | Salmon et al. |
| 2020/0311567 A1 | 10/2020 | Salmon et al. |
| 2021/0229816 A1* | 7/2021 | Daubner ............ B64D 11/0624 |

* cited by examiner

SEATING SYSTEMS FOR AIRCRAFT AND METHODS OF ARRANGING SEATING SYSTEMS

FIELD

The present disclosure relates to seating systems for aircraft and methods of arranging seating systems.

BACKGROUND

Aircraft configured for passenger transport typically include passenger seats and seat rails that secure the passenger seats within a cabin of the aircraft. Each passenger seat may include, or be associated with, a passenger seat electrical system, which may include, for example, an entertainment device, an audio device, and/or an external device electrical port. Such aircraft also typically include wiring that is connected to the passenger seat electrical systems and that is used for providing electrical data or power thereto. Conventionally, this wiring includes wires or wire bundles that are run from a central electrical data or power source to each passenger seat electrical system. Such aircraft also typically include coverings that extend over and shield each wire or wire bundle from the interior of the cabin. Between flights of an aircraft, an operator may decide to reconfigure the arrangement of the passenger seats. For example, the pitch between passenger seats within a given section of the cabin may be adjusted to change the class (e.g., economy class, business class, or first class) of the section. Any such rearrangement of passenger seats typically involves individual passenger seats being detached from the seat rails, moved to new locations, and reattached to the seat rails. With traditional wiring schemes, any such rearrangement also entails moving the individual wires or wire bundles that connect to the passenger seat electrical systems and reconfiguring or replacing the accompanying covers. This process not only can be time consuming and complicated; in some instances, adjusting passenger seat arrangements with traditional wiring schemes can necessitate a complete reinstallation of the wiring.

SUMMARY

Seating systems for cabins of aircraft and methods of arranging seating systems are disclosed herein. The seating systems comprise at least one seat module with a seat track assembly comprising a plurality of seat-receiving regions, each being configured to couple to the seat module. The seat track assembly further comprises a seat track and an electrical distribution system. The seat track is configured to extend along a cabin floor of the cabin and to selectively secure the seat module to any of the seat-receiving regions. The electrical distribution system comprises an electrical conduit and a plurality of track electrical contacts respectively disposed along the seat track in the seat-receiving regions. Each track electrical contact is in electrical connection with or configured for electrical connection to the electrical conduit. The seat module comprises a base coupler configured to couple with the seat track at any selected seat-receiving region and a seat module electrical system that comprises a seat electrical contact configured to electrically connect to any selected track electrical contact. The base coupler and the seat track are configured to position the seat electrical contact in electrical connection with a respective track electrical contact of a selected seat-receiving region when the base coupler is coupled with the seat track at the selected seat-receiving region. The electrical distribution system is configured to provide electricity to the seat module electrical system when the seat electrical contact is in electrical connection with any track electrical contact.

The methods comprise coupling the base coupler of the seat module to a selected seat-receiving region and providing, by the electrical distribution system, electricity to the seat module via the electrical connection. The coupling comprises engaging the seat module with the seat track at the selected seat receiving region and forming an electrical connection between the seat electrical contact and the respective track electrical contact of the selected seat-receiving region.

DESCRIPTION

Figure 1:
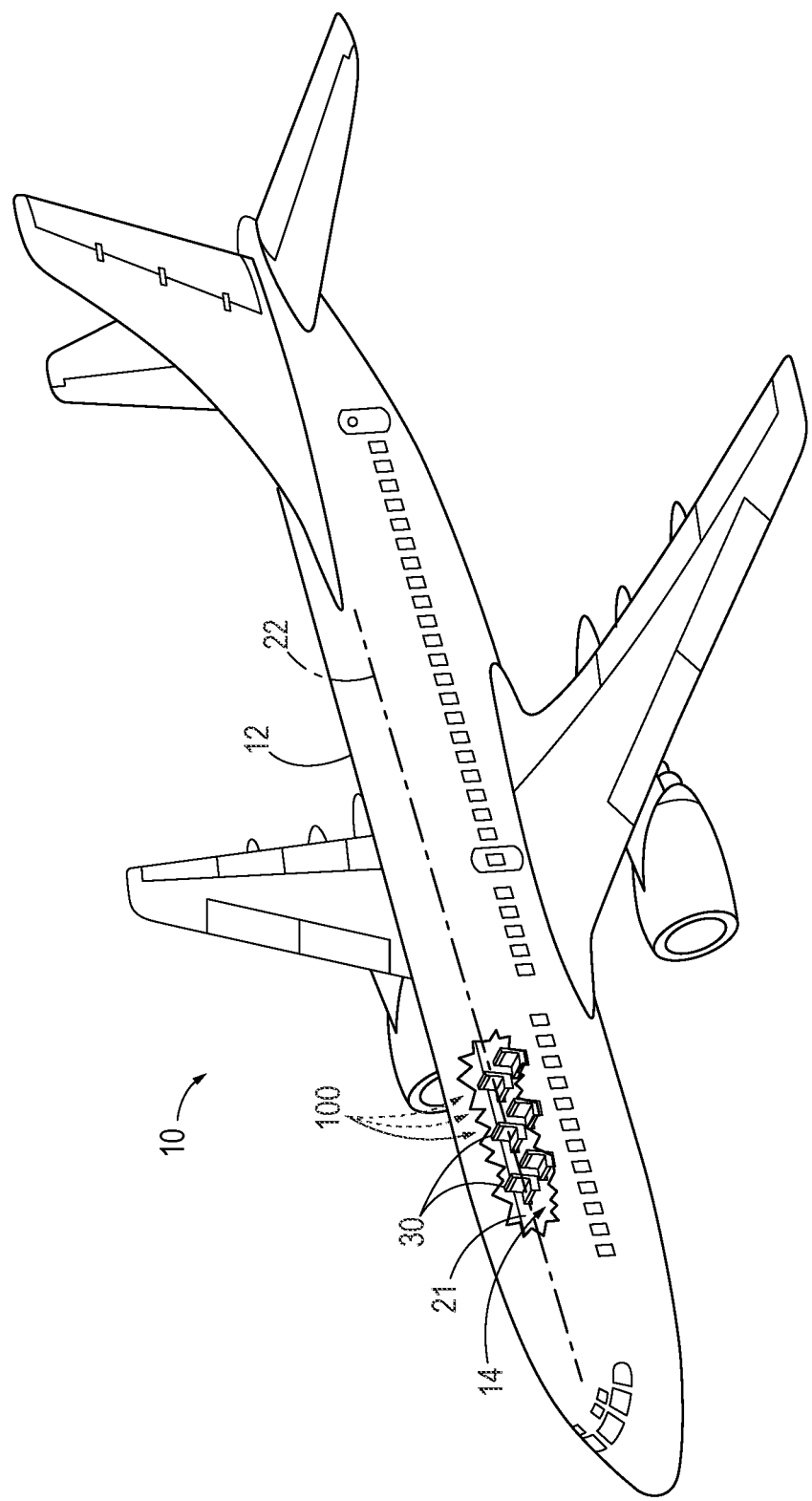
FIG. 1 is a perspective view of example aircraft.

FIGS. 1-10 provide illustrative, non-exclusive examples of seating systems 100, aircraft 10 comprising seating systems 100, cabins 14 comprising seating systems 100, and methods 500 of arranging seating systems, according to the present disclosure. Elements that serve a similar, or at least substantially similar, purpose are labelled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be included in and/or utilized with any of FIGS. 1-10 without departing from the scope of the present disclosure.

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. In schematic FIGS. 3-6, dotted lines are used to indicate electrical components, or components that are utilized to conduct various forms of electricity, and these elements may or may not be essential to the illustrated example as understood from the discussion herein. Also in schematic FIGS. 3-6, dot-dash lines are utilized to indicate various virtual features (e.g., dimensions and/or configurations), and the features indicated in dot-dash lines likewise may or may not be essential to the illustrated embodiment.

FIG. 1 is an illustration of an example aircraft 10 according to the present disclosure. Aircraft 10 comprises a fuselage 12 that encloses a cabin 14. Cabin 14 defines an interior space 21 and comprises a plurality of passenger seats 30 that are within interior space 21. In some examples, passenger seats 30 are distributed about a longitudinal axis 22 of cabin 14. Aircraft 10 also includes at least one seating system 100 within cabin 14. At least one passenger seat 30, and optionally, a plurality of passenger seats within cabin 14 may be comprised in and/or supported by seating system 100. In some examples, aircraft 10 comprises a plurality of seating systems 100. Examples of seating systems 100 are illustrated and discussed in more detail herein with reference to FIGS. 3-9.

Aircraft 10 may comprise any suitable type of aircraft, with examples comprising private aircraft, commercial aircraft, cargo aircraft, passenger aircraft, military aircraft, jetliners, wide-body aircraft, and/or narrow-body aircraft. Aircraft 10 is configured to, or may be used to, transport any suitable type of payload such as passengers, crew, cargo, and/or combinations thereof. While FIG. 1 shows an example in which aircraft 10 is a fixed wing aircraft, seating systems 100 may be comprised in and/or utilized with any other suitable type of aircraft, such as rotor craft and/or helicopters, without departing from the scope of the present disclosure. Seating systems 100 also are not limited to use or inclusion in aircraft, and seating systems 100 may be comprised and/or utilized in other types of vehicles, such as land craft, busses, cars, vans, trains, spacecraft, and/or watercraft without departing from the scope of the present disclosure.

Figure 2:
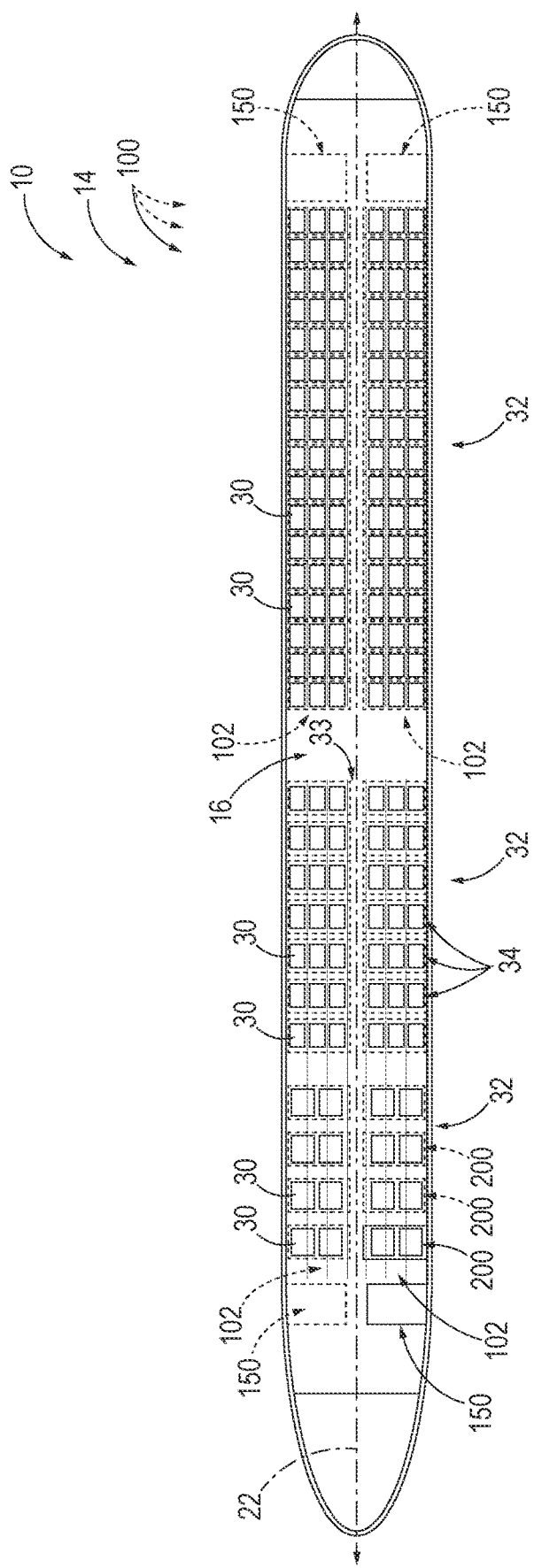
FIG. 2 is a schematic plan view illustrating examples of cabins of aircraft.

FIG. 2 is a schematic plan view illustrating examples of cabins 14 of aircraft 10, according to the present disclosure. Cabin 14 additionally or alternatively may be referred to herein as aircraft cabin 14. As shown, cabin 14 comprises a cabin floor 16 and a plurality of passenger seats 30 supported relative to cabin floor 16 and arranged with respect to one another in a predefined pattern. In some examples, the plurality of passenger seats 30 are arranged in one or more predefined grids. In some examples, passenger seats 30 are arranged in a plurality of sections 32 (e.g., first class, business class, economy class, etc.) with at least one section 32 optionally being arranged in a different pattern relative to another section 32. For example, the spacing between passenger seats 30 along longitudinal axis 22, or the seat pitch, may be different between sections 32 and/or the lateral spacing (i.e., spacing normal to longitudinal axis 22) between passenger seats 30 may be different between sections 32. In some examples, passenger seats 30 are arranged in rows 34 that run substantially normal to longitudinal axis 22, and the number of passenger seats 30 in a given row 34 may be different between different sections 32.

Cabin 14 comprises at least one seating system 100 according to the present disclosure. As discussed in more detail herein with reference to FIGS. 3-9, seating system 100 comprises a seat track assembly 102 defining a plurality of seat receiving regions, and at least one seat module 200 configured to selectively couple with seat track assembly 102 at any given seat-receiving region. In some examples, seating system 100 comprises a plurality of seat modules 200 configured to selectively couple with seat track assembly 102 at any selected seat-receiving region. In some examples, each seat module 200 includes at least one, and optionally a plurality of, passenger seats 30. In some more specific examples, each seat module 200 comprises a row 34 of seats.

In some examples, seating system 100 comprises a plurality of seat track assemblies 102, each being configured to support a respective plurality of seat modules 200. In some examples, seat track assemblies 102 are separated from one another by an aisle 33 of cabin 14 and/or by section 32. In some examples, each section 32 comprises one or more seat track assemblies 102. Additionally or alternatively, in some examples, a single seat track assembly 102 extends through two or more sections 32. In some examples, each seat track assembly 102 is configured to support seat modules 200 in a plurality of different arrangements or grids. In other words, seat modules 200 may be coupled with the seat-receiving regions of seat track assembly 102 in a plurality of different arrangements or grids. In this way, seat modules 200 may be coupled with seat-receiving regions 104 to arrange passenger seats in the desired arrangement and/or grid.

Seating system 100 further comprises an electrical distribution system 150 configured to provide electrical power to a seat module electrical system of seat module 200 when seat module 200 is coupled with seat track assembly 102, as discussed in more detail herein. For examples in which cabin 14 comprises a plurality of seat track assemblies 102, seating system 100 may comprise an independent electrical distribution system 150 for each seat track assembly 102 and/or two or more seat track assemblies 102 may share a common electrical distribution system 150.

Figure 3:
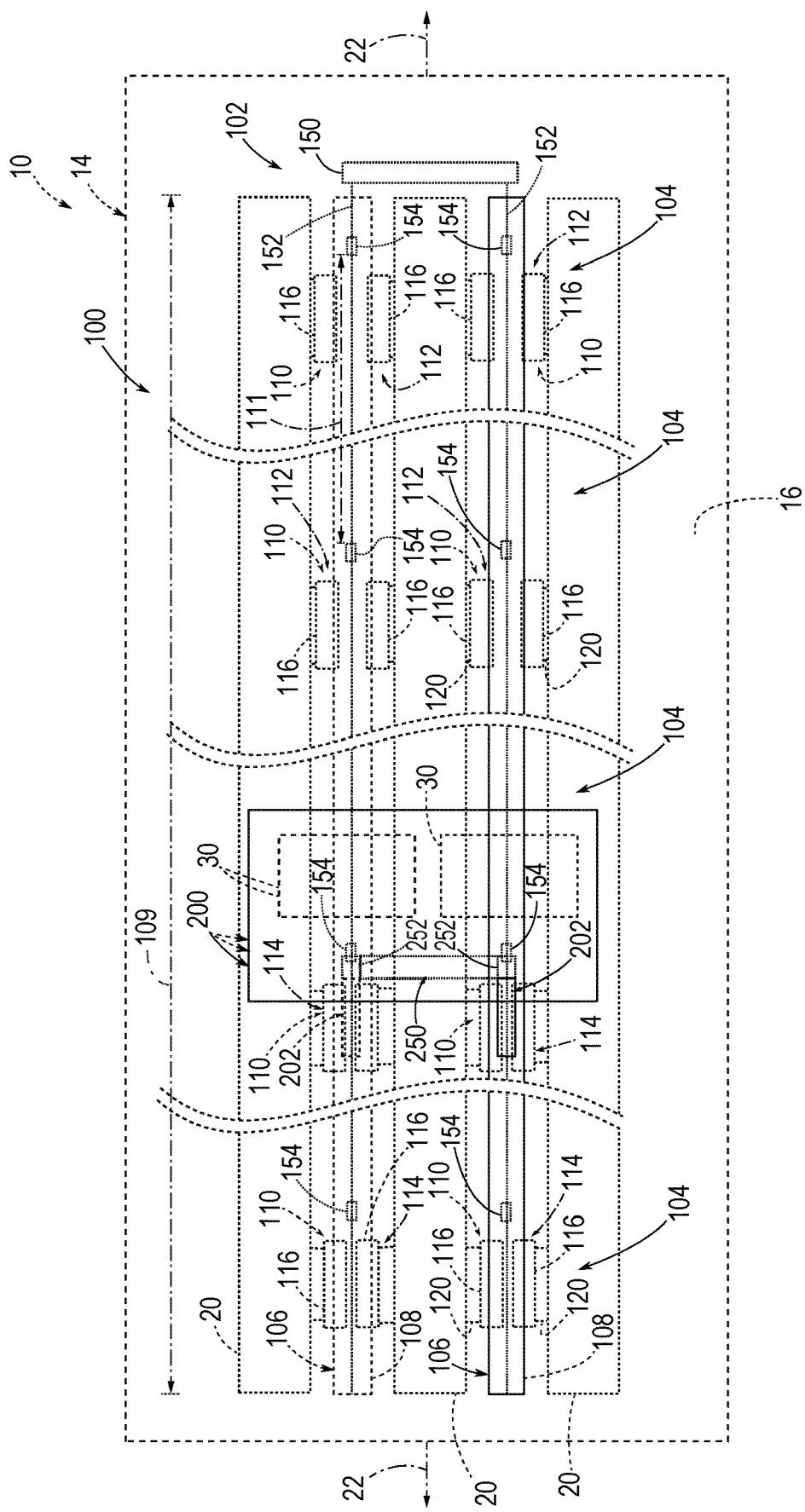
FIG. 3 is a schematic plan illustrating examples of seating systems, according to the present disclosure.
Figure 4:
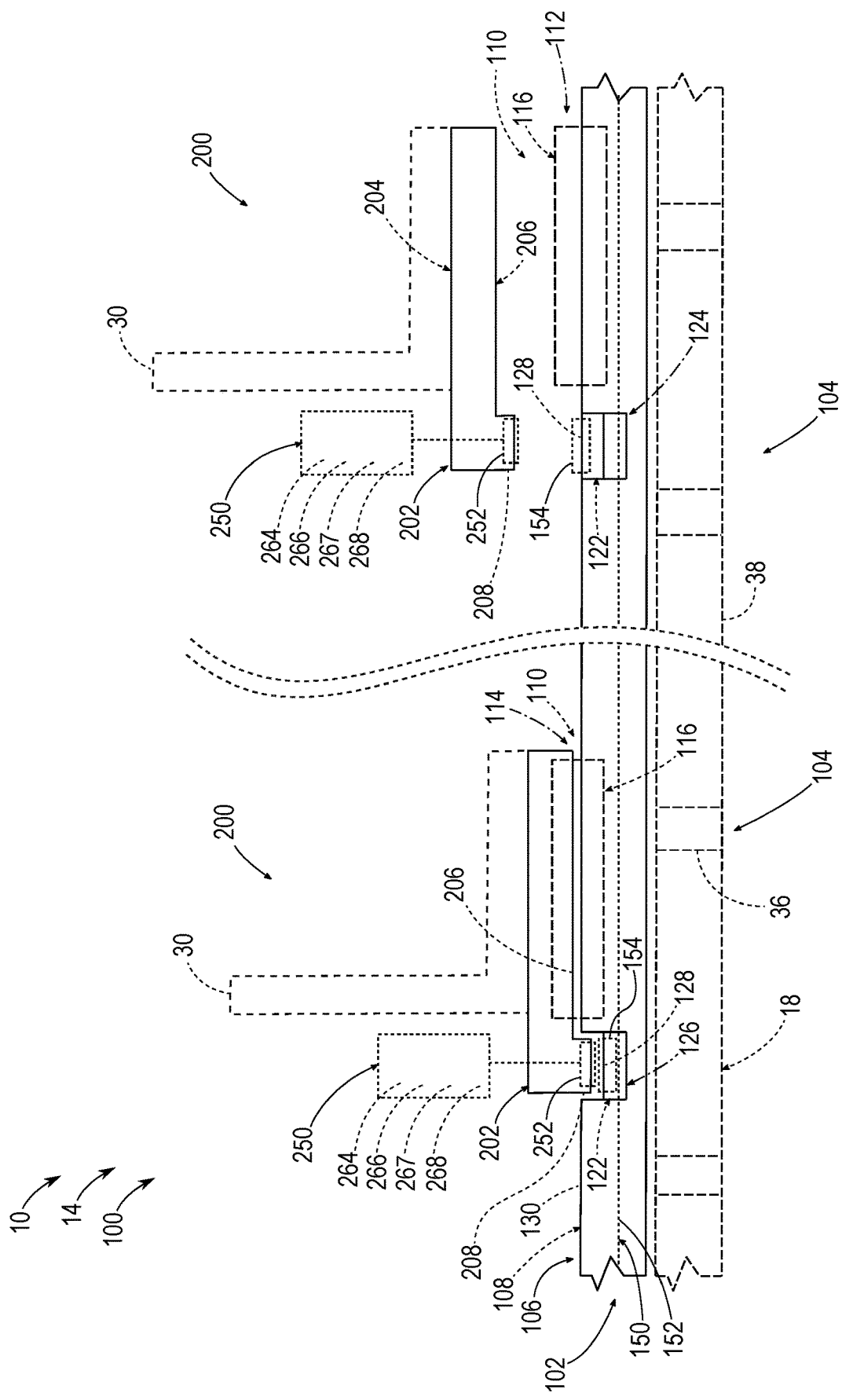
FIG. 4 is a schematic side elevation view illustrating examples of seating systems, according to the present disclosure.
Figure 5:
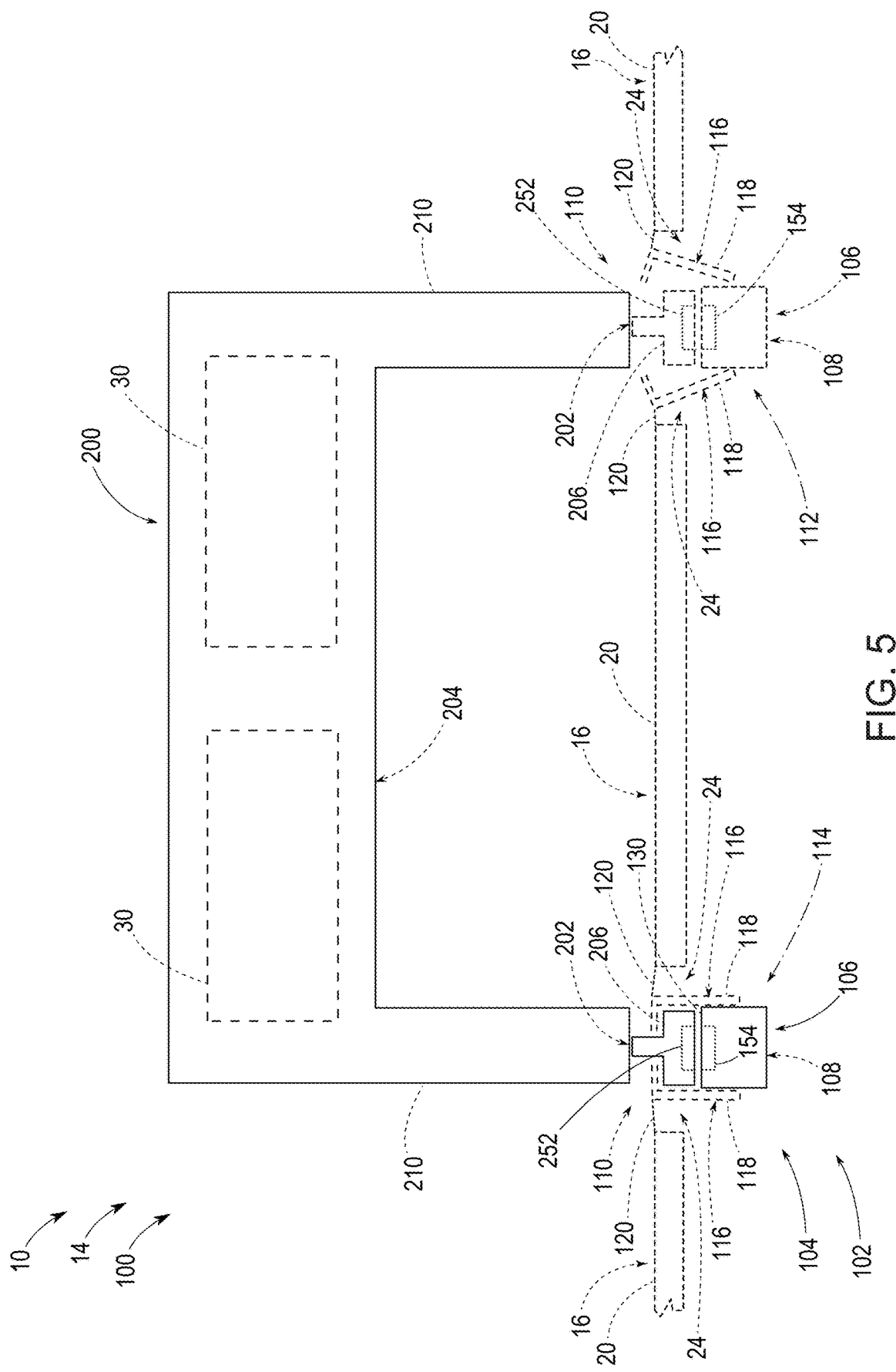
FIG. 5 is a schematic front elevation view illustrating examples of seating systems, according to the present disclosure.
Figure 6:
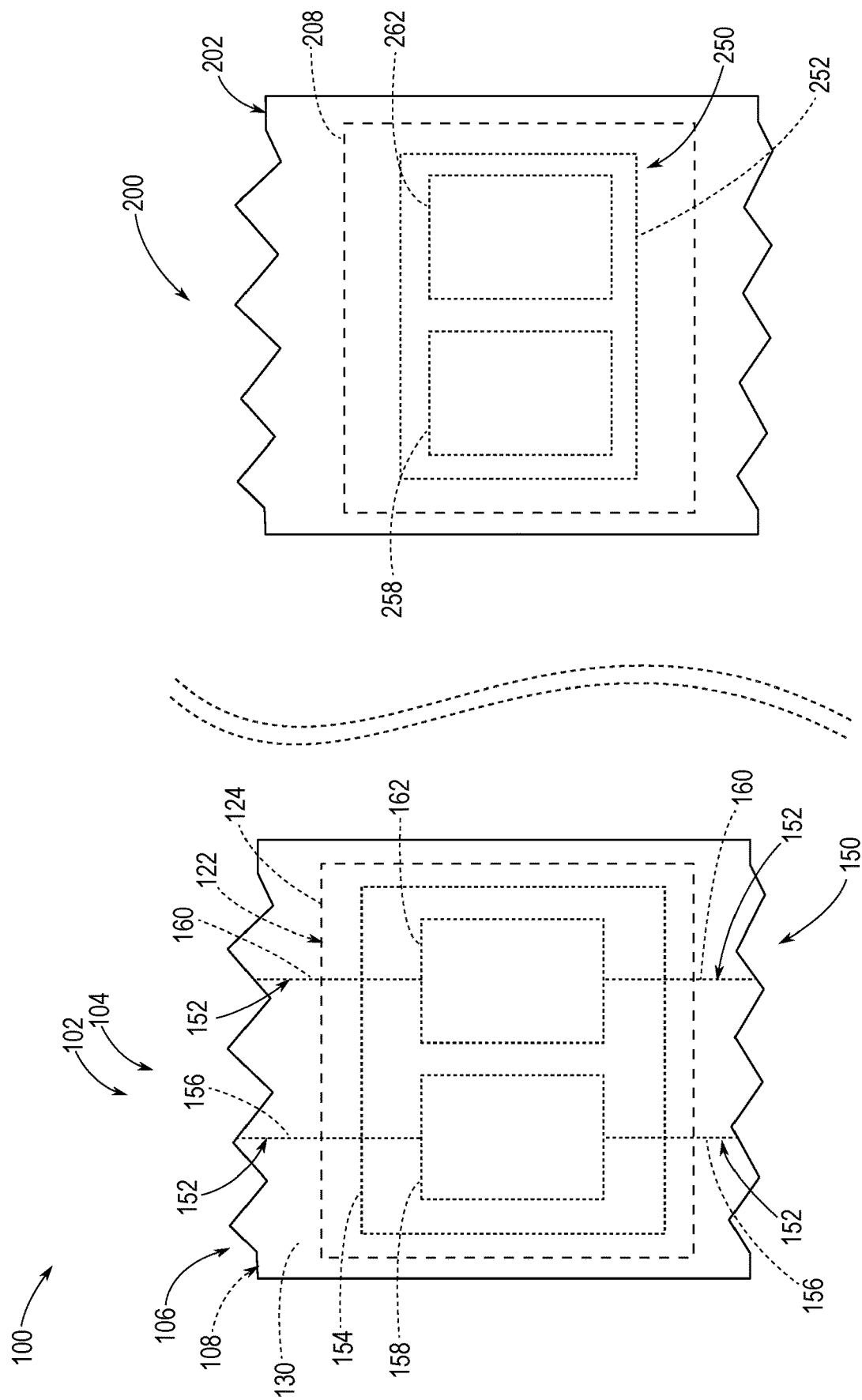
FIG. 6 is a schematic partial view illustrating examples of track electrical contacts and seat electrical contacts of seating systems, according to the present disclosure.

FIGS. 3-6 provide examples of seating systems 100, according to the present disclosure. More specifically, FIG. 3 is a schematic plan view of seating systems 100, FIG. 4 is a schematic side elevation view of seating systems 100, FIG. 5 is a schematic elevation view of seating systems 100, and FIG. 6 is a schematic partial view of examples of track electrical contacts 154 and seat electrical contacts 252 of seating systems 100. Generally with reference to FIGS. 3-6, seating system 100 comprises at least one seat module 200 and a seat track assembly 102 defining a plurality of seat-receiving regions 104, each being configured to couple to the seat module 200. Seat track assembly 102 comprises a seat track 106 configured to extend along a cabin floor 16 of cabin 14 and to selectively secure seat module 200 to any seat-receiving region 104. In some examples, seat track 106 is fixed relative to cabin floor 16 and/or extends at least substantially parallel to longitudinal axis 22 of cabin 14. In other words, seat-receiving regions 104 may be distributed along longitudinal axis 22 of cabin 14.

Seat track assembly 102 further comprises an electrical distribution system 150. Electrical distribution system 150 comprises an electrical conduit 152 and a plurality of track electrical contacts 154 respectively disposed along seat track 106 in the plurality of seat-receiving regions 104. Each track electrical contact 154 is in electrical connection with or configured for electrical connection to electrical conduit 152, as discussed in more detail herein.

Seat module 200 comprises a base coupler 202 configured to couple with seat track 106 at any selected seat-receiving region 104. Seat module 200 also comprises a seat module electrical system 250. Seat module electrical system 250 comprises a seat electrical contact 252 configured to electrically connect to any selected track electrical contact 154 of seat track assembly 102. More specifically, base coupler 202 and seat track 106 are configured to position seat electrical contact 252 of seat module 200 in electrical connection with the respective track electrical contact 154 of a selected seat-receiving region 104 when the base coupler 202 of seat module 200 is coupled with the seat track 106 at the selected seat-receiving region 104. In other words, seat track 106 and seat module 200 are configured such that coupling base coupler 202 with seat track 106 at a selected seat-receiving region 104 places seat electrical contact 252 in electrical connection with the track electrical contact 154 of the selected seat-receiving region 104. Accordingly, each seat-receiving region 104 may include all of the necessary components for mechanically coupling and electrically connecting seat module 200 to seat track assembly 102.

In view of the above, coupling base coupler 202 to seat track 106 at any selected seat-receiving region 104 may automatically connect seat electrical contact 252 with the respective track electrical contact 154. In other words, coupling base coupler 202 to seat track 106 may be performed as a single or concerted operation with electrically connecting seat electrical contact 252 with the respective track electrical contact 154. This is different from conventional seating systems where the wiring for the seat electrical system is connected to the seat electrical system separately from mechanically coupling the passenger seat to the seat track.

Electrical distribution system 150 is configured to distribute any suitable form of electricity through electrical conduit 152 and track electrical contacts 154. Electrical distribution system 150 also is configured to provide electricity to seat module electrical system 250 when seat electrical contact 252 is in electrical connection with any track electrical contact 154. Stated another way, electrical distribution system 150 is configured to provide electricity to seat module electrical system 250 via the track electrical contact 154 of any selected seat-receiving region 104 when seat module 200 is coupled with the selected seat-receiving region 104.

Track electrical contacts 154 may be distributed along a length 109 of seat track 106 with a selected electrical contact spacing 111 between adjacent track electrical contacts 154. In some examples, electrical contact spacing 111 defines the length of a seat-receiving region 104. Electrical contact spacing 111 may be the same or different between each pair of adjacent track electrical contacts 154. More specific examples of suitable electrical contact spacing 111 include at least 5 cm, at least 7 cm, at least 8 cm, at least 10 cm, at least 12 cm, at least 15 cm, at least 20 cm, at least 25 cm, at least 30 cm, at most 5 cm, at most 7 cm, at most 8 cm, at most 10 cm, at most 12 cm, at most 15 cm, at most 20 cm, at most 25 cm, at most 30 cm, at most 50 cm, and/or at most 100 cm.

When a plurality of seat modules 200 are coupled to seat track assembly 102, each seat module 200 thereof may be allotted with a footprint, or area along cabin floor 16. Each footprint includes a length, or a seat pitch, that is measured parallel to longitudinal axis 22 and between the aft-most portions of base couplers 202 of adjacent seat modules 200. For example, the seat pitch utilized in commercial passenger aircraft is typically in the range of 70-250 cm. In some examples, electrical contact spacing 111 is less than a minimum seat pitch between rows of seat modules 200 coupled to seat track assembly 102, such that more than one track electrical contact 154 is positioned within the length of the footprint allotted to any given seat module 200 or passenger seat 30 thereof. Stated another way, in some examples, the length of any given seat-receiving region 104 is less than the length of a footprint allotted to any given passenger seat 30. In such examples, seat track assembly 102 comprises more seat-receiving regions 104 that the number of seat modules that can be effectively coupled to seat track 106, which permits greater versatility in the number of arrangements, spacing, and/or seat pitches with which a plurality of seat modules 200 can be coupled to seat track assembly 102.

For some examples in which track electrical contact 154 is "configured for" electrical connection to track electrical conduit 152, coupling base coupler 202 of seat module 200 with the seat-receiving region 104 corresponding to the track electrical contact 154 places the track electrical contact in electrical connection with electrical conduit 152. In some such examples, track electrical contact 154 is maintained or biased to be electrically disconnected from electrical conduit 152 without base coupler 202 being coupled with the corresponding seat-receiving region 104 of seat track 106. In some examples, disengaging base coupler 202 from a given seat-receiving region 104 of seat track 106 disconnects track electrical contact 154 from electrical connection to electrical conduit 152. With this in mind, in some examples, seat electrical contact 252 is disposed along and/or integrated into base coupler 202. In some examples, at least some of and optionally all of track electrical contacts 154 are integrated into, integral with, and/or define portions of seat track 106. As a more specific example, seat track 106 may comprise a plurality of bearing surfaces 130 each being within a respective seat-receiving region configured to contact base coupler 202. In some such examples, at least some of the plurality of track electrical contacts 154 are respectively comprised in or defined along the plurality of bearing surfaces 130.

In some examples, seat module 200 comprises at least one passenger seat 30 and is configured to support passenger seat(s) 30 on seat track 106. In some examples, seat module 200 comprises more than one passenger seat 30, such as two passenger seats 30, three passenger seats 30, four passenger seats 30, five passenger seats 30, six passenger seats 30, seven passenger seats 30, eight passenger seats 30, and/or more than eight passenger seats 30. In some examples, seat module 200 comprises a seat support structure 204 that interconnects the at least one passenger seat 30 and base coupler 202 and that is configured to support the at least one passenger seat 30 on base coupler 202. For example, seat support structure 204 may comprise at least one leg 210 extending between and interconnecting base coupler 202 and passenger seat(s) 30. As discussed in more detail herein, in some examples, seat module 200 comprises a plurality of base couplers 202. In such examples, seat support structure 204 interconnects passenger seat(s) 30 and the plurality of base couplers 202 and is configured to support passenger seat(s) 30 on the plurality of base couplers 202. In a more specific example, seat support structure 204 comprises a plurality of legs 210 that respectively interconnect the plurality of base couplers 202 to passenger seat(s) 30. Stated another way, each leg 210 may be coupled to a respective base coupler 202.

Electrical distribution system 150 is configured to distribute any suitable type of electricity to seat module(s) 200. In some examples, electrical distribution system 150 is configured to provide electrical power to seat module(s) 200. In such examples, electrical distribution system 150 may be configured to distribute electrical power in any suitable form, for example, in the form of direct current (DC) and/or in the form of alternating current (AC). Additionally or alternatively, electrical distribution system 150 is configured to provide electrical data or electrical data signals to seat module(s) 200. Similarly, seat module electrical system 250 is configured to receive and/or utilize electrical power and/or electrical data from electrical distribution system in any suitable manner. For example, seat module electrical system 250 may include one or more entertainment devices 264, one or more audio devices 266, a lighting assembly 267, and/or one or more external device electrical ports 268, and seat module electrical system 250 may be configured to provide electrical power and/or electrical data supplied by electrical distribution system 150 to entertainment devices 264, audio devices 266, lighting assembly 267, and/or external device electrical ports 268. In some examples, seat module electrical system 250 comprises an entertainment device 264, an audio device 266, a lighting assembly 267, and/or an external device electrical port 268 for each passenger seat 30 comprised in seat module 200. Examples of entertainment devices 264 and/or associated devices include a video monitor, a control assembly for the video monitor, and/or a communications module for supplying data to entertainment devices 264 and/or audio devices 266. Examples of external device electrical ports 268 include a charging port, a USB port, a data port, a USB charging port, and/or a USB data port.

As best seen in FIG. 6, in some examples, electrical conduit 152 comprises an electrical power conduit 156 and electrical distribution system 150 is configured to distribute electrical power through electrical power conduit 156. In some such examples, each track electrical contact 154 comprises a track electrical power contact 158 configured for or in electrical connection with electrical power conduit 156, seat electrical contact 252 comprises a seat electrical power contact 258, and electrical distribution system 150 is configured to provide electrical power to seat module electrical system 250 when seat electrical power contact 258 is in electrical connection with the track electrical power contact 158 of any track electrical contact 154. Additionally or alternatively, in some examples, electrical conduit 152 comprises an electrical data conduit 160 and electrical distribution system 150 is configured to distribute electrical data through electrical data conduit 160. In some such examples, each track electrical contact 154 comprises a track electrical data contact 162 configured for or in electrical connection with electrical data conduit 160, seat electrical contact 252 comprises a seat electrical data contact 262, and electrical distribution system 150 is configured to provide electrical data to seat module electrical system 250 when seat electrical data contact 262 is in electrical connection with the track electrical data contact 162 of any track electrical contact 154. In some examples, seat electrical data contact 262 and/or seat electrical power contact 258 are respectively placed in electrical connection with track electrical data contact 162 and track electrical power contact 158 in a similar, or at least substantially similar manner to that discussed herein with respect to seat electrical contact 252 and track electrical contact 154.

Referring again generally to FIGS. 3-6, in some examples, seat track 106 comprises a seat rail 108 that is operatively attached to a sub-floor support structure 18 of cabin 14. Seat rail 108 may extend a length 109 of seat track 106 and/or substantially parallel to longitudinal axis 22. In some examples, sub-floor support structure 18 comprises a plurality of transverse beams 36 that extend substantially parallel to cabin floor 16 and transverse to longitudinal axis 22 and/or a plurality of longitudinal beams 38 that extend at least substantially parallel to cabin floor 16 and at least substantially parallel to longitudinal axis 22. In some examples, seat rail 108 is configured to engage base coupler 202 of seat module 200 and support seat module 200 on sub-floor support structure 18. In some examples, track electrical contacts 154 are disposed, integrated into, and/or integral with seat rail 108. In some examples, electrical conduit 152 is contained within, integrated into, and/or at least partially partitioned from an interior space of cabin 14 by seat rail 108. In some examples, seat rail 108 comprises bearing surfaces 130 discussed herein, and bearing surfaces 130 are positioned along seat rail 108 opposed to or facing away from sub-floor support structure 18.

In some examples, seat track 106 further comprises a plurality of engaging mechanisms 110 respectively disposed along seat track 106 in seat-receiving regions 104 and each being configured to interlock with base coupler 202 and optionally engage base coupler 202 with seat rail 108. In some examples, each engaging mechanism 110 is configured to operatively secure seat module 200 to seat track 106 in the respective seat-receiving region 104. In some examples, each engaging mechanism 110 is configured to secure seat electrical contact 252 of seat module 200 in electrical connection with the respective track electrical contact 154 of the respective seat-receiving region 104 when engaging mechanism 110 is coupled to base coupler 202. In other words, engaging mechanism 110 may be configured to maintain electrical connection between track electrical contact 154 and seat electrical contact 252 by interlocking with base coupler 202.

In some examples, each engaging mechanism 110 is configured to selectively transition between a releasing configuration 112, in which engaging mechanism 110 permits the base coupler 202 of seat module 200 to move into and out of engagement with seat track 106, and an engaging configuration 114 in which engaging mechanism 110 is configured to interlock with base coupler 202 and optionally secure base coupler 202 to seat track 106. As a more specific example, each engaging mechanism 110 may comprise a pair of brackets 116 operatively coupled to seat rail 108 and configured to selectively interlock with base coupler 202. In some examples, each pair of brackets 116 is configured to move relative to seat rail 108 between releasing configuration 112 and engaging configuration 114. In some examples, the brackets 116 of a pair of brackets 116 are positioned on either lateral side 118 of seat track 106, with seat rail 108 being positioned therebetween. In some such examples, brackets 116 are configured to move laterally, or transverse to longitudinal axis 22, towards seat rail 108 from releasing configuration 112 to engaging configuration 114 and laterally away from seat rail 108 from engaging configuration 114 to releasing configuration 112. As more specific examples, brackets 116 may be configured to translate, slide, pivot, hinge, and/or rotate relative to seat rail 108 between releasing configuration 112 and engaging configuration 114. In some examples, each pair of brackets 116 is configured to move independently of, or relative to, brackets 116 of adjacent seat-receiving regions 104. In some examples, brackets 116 of adjacent seat-receiving regions 104 abut or are closely spaced (e.g., by less than 1 cm) to one another.

As perhaps best seen in FIG. 4, in some examples, base coupler 202 comprises a bearing foot 206 that is configured to engage any selected bearing surface 130 of seat rail 108. In some examples, each pair of brackets 116 is configured to secure bearing foot 206 in engagement with seat rail 108 when engaging mechanism 110 is in engaged configuration 114. Additionally or alternatively, pair of brackets 116 may act as a closeout mechanism and cover bearing foot 206 in engaging configuration 114.

In some examples, cabin 14 comprises a plurality of floor panels 20 supported by sub-floor support structure 18 and defining portions of cabin floor 16. In some examples, a first floor panel 20 is positioned adjacent to a first lateral side 118 of seat track 106, and a second floor panel 20 is positioned adjacent to a second lateral side 118 of seat track 106. In some examples, an upper surface of the first and second floor panels 20 is at least substantially aligned with the bearing surfaces 130 of seat rail 108. In some examples, each pair of brackets 116 defines the lateral sides 118 of seat track 106 along the region of seat track that brackets 116 are positioned. Namely, a first bracket 116 of a given pair of brackets 116 defines a corresponding portion of the first lateral side 118 of seat track 106, and a second bracket 116 of the pair of brackets 116 defines a corresponding portion of the second lateral side 118 of seat track 106. In some examples, the first bracket 116 is configured to move laterally relative to the first floor panel 20 between engaging configuration 114 and releasing configuration 112, and the second bracket 116 is configured to move laterally relative to the second floor panel 20 between the engaging configuration 114 and the releasing configuration 112. More specifically, first floor panel 20 and second floor panel 20 may be spaced apart from lateral sides 118 of seat track 106 along each pair of brackets 116 to create gaps 24 therebetween that permit movement of brackets 116 relative to floor panels 20.

In some examples, seating system 100 further comprises a plurality of flexible guards 120 that are configured to closeout or cover the gaps 24 between each pair of brackets 116 and floor panels 20. More specifically, flexible guards 120 may include a first subset of flexible guards 120 that are respectively coupled to and extend between the first floor panel 20 and the first bracket 116 of each pair of brackets 116 and a second subset of flexible guards 120 that are respectively coupled to and extend between the second floor panel 20 and the second bracket 116 of each pair of brackets 116. Each flexible guard 120 may be configured to permit the respective bracket 116 to move relative to the respective floor panel 20 while covering the gap 24 therebetween and while the bracket 116 is in the releasing configuration 112 or in the engaging configuration 114. For example, flexible guard 120 may include a sheet of flexible material that is deformed, compressed, and/or buckled when the respective bracket 116 is in the releasing configuration 112 and that is extended, planar, and/or taut when the respective bracket 116 is in the engaging configuration 114. In some examples, flexible guard 120 is at least substantially aligned with floor panel 20 when the respective bracket 116 is in engaging configuration 114.

As mentioned, in some examples, fewer than all seat-receiving regions 104 are coupled to a seat module 200 when a plurality of seat modules 200 are coupled to and arranged on seat track assembly 102. In some examples, each pair of brackets 116 is configured to be maintained in engaged configuration 114 without base coupler 202 present in the respective seat-receiving region 104 and operate as a closeout mechanism, covering or shielding seat rail 108 from the interior space of cabin 14. In other words, brackets 116 of a seat-receiving region 104 that is not directly occupied by base coupler 202 may be maintained in engaged configuration 114 to cover seat rail 108 and prevent debris from entering seat track 106.

In some examples, seat track 106 further comprises a plurality of recessing plungers 122 disposed along seat rail 108 and each respectively positioned within a corresponding seat-receiving region 104. More specifically, each recessing plunger 122 may form a respective portion of seat rail 108, and recessing plungers 122 may divide seat rail 108 into a plurality of sections. As best seen in the examples of FIG. 4, each recessing plunger 122 comprises a platform surface 128 that is configured to translate vertically (i.e., translate with respect to waterline) relative to the bearing surfaces 130 of seat rail 108. Each recessing plunger 122 is configured to selectively transition between a nominal configuration 124 and a recessed configuration 126. In recessed configuration 126, platform surface 128 is recessed relative to, or positioned beneath, its position in nominal configuration 124. In some examples, platform surface 128 is aligned or flush with bearing surfaces 130 in nominal configuration 124.

For some examples in which seat track 106 comprises recessing plungers 122, base coupler 202 of seat module 200 further comprises a base protrusion 208 that is configured to engage the platform surface 128 of recessing plunger 122 and maintain recessing plunger 122 in the recessed configuration 126 when base coupler 202 is coupled to the corresponding seat-receiving region 104. As mentioned, bearing foot 206 of base coupler 202 is configured to engage or seat on bearing surface 130 of seat rail 108. Base protrusion 208 may protrude beneath bearing foot 206 such that, when bearing foot 206 is seated on bearing surface 130 of a selected seat-receiving region 104, bearing foot 206 urges platform surface 128 of recessing plunger 122 of the selected seat-receiving region 104 beneath bearing surface 130 and/or into its recessed position. In some examples, each recessing plunger 122 is biased towards nominal configuration 124, such that each recessing plunger 122 is maintained in nominal configuration 124 without engagement from base coupler 202. As a more specific example, each recessing plunger 122 may comprise a spring or a resilient member that biases platform surface 128 towards nominal configuration 124.

In some examples, each recessing plunger 122 is configured to engage base protrusion 208 of base coupler 202 when base coupler 202 is coupled to the corresponding seat-receiving region 104 to secure seat module 200 against longitudinal and/or lateral displacement from the respective seat-receiving region 104. As discussed in more detail herein, recessing plunger 122 may include interior sidewalls along which platform surface 128 is configured to translate, and these interior sidewalls may be exposed when recessing plunger 122 is in recessed configuration 126. In some examples, the interior sidewalls of recessing plunger 122 engage base protrusion 208 when base coupler 202 is coupled to the respective seat-receiving region 104 to secure, or assist in securing, seat module 200 to the respective seat-receiving region 104. In some examples, recessing plunger 122 is configured to index seat module 200 to the respective seat-receiving region 104. In other words, engaging base coupler 202 with recessing plunger 122 may position seat module 200 correctly within seat-receiving region 104. In some examples, recessing plungers 122 may be selectively spaced along seat rail 108 to define the respective positions of seat-receiving regions 104.

In some examples, at least some of, and optionally all of, track electrical contacts 154 are respectively disposed along the platform surfaces 128 of the plurality of recessing plungers 122. In some such examples, adjacent recessing plungers 122 are spaced apart from one another by electrical contact spacing 111. In other words, each track electrical contact 154 may be positioned on a respective platform surface 128. In some examples, seat electrical contact 252 of seat module 200 is positioned along base protrusion 208 such that, when base protrusion 208 engages platform surface 128 of any selected recessing plunger 122, seat electrical contact 252 is placed in electrical connection with the track electrical contact 154 disposed on the selected recessing plunger 122.

For some examples in which track electrical contact 154 is disposed along platform surface 128, recessing plunger 122 is configured to position track electrical contact 154 in electrical connection with electrical conduit 152 when recessing plunger 122 is in recessed configuration 126, and recessing plunger 122 is configured to disconnect the corresponding track electrical contact 154 from electrical connection with electrical conduit 152 when recessing plunger 122 is in nominal configuration 124. In this way, coupling base coupler 202 to seat-receiving region 104, thereby engaging base protrusion 208 of base coupler 202 with platform surface 128, may move track electrical contact 154 into electrical connection with electrical conduit 152. Likewise, decoupling base coupler 202 from seat-receiving region 104 may disconnect track electrical contact 154 from electrical conduit 152.

With continued reference to FIGS. 3-6, seat track assembly 102 may comprise a plurality of seat tracks 106. In some such examples, the plurality of seat tracks 106 extend at least substantially parallel to and spaced apart from one another. In such examples, seat module 200 may comprise a corresponding plurality of base couplers 202, each being configured to couple to a respective seat track 106. For example, seat track assembly 102 may comprise a first seat track 106 and a second seat track 106, and seat module 200 may comprise a corresponding first base coupler 202 and a second base coupler 202. For examples in which seat track assembly 102 comprises a plurality of seat tracks 106, each seat-receiving region 104 may be defined across, or between, the plurality of seat tracks 106.

Seat tracks 106 may comprise one or more of the same or one or more different features as one another. In some examples, each seat track 106 comprises a respective plurality of engaging mechanisms 110 and/or a respective plurality of recessing plungers 122 that are aligned with one another along the length 109 of seat track assembly 102. In other words, each seat track 106 may comprise a respective recessing plunger 122 and/or engaging mechanism 110 within each seat-receiving region 104.

For some examples in which seat track assembly 102 comprises a plurality of seat tracks 106, electrical distribution system 150 comprises a respective electrical conduit 152 and a respective plurality of track electrical contacts 154 for each seat track 106, as discussed herein. In some such examples, seat module electrical system 250 comprises a respective plurality of seat electrical contacts 252, each being configured to electrically connect to a corresponding track electrical contact 154 of a respective seat track 106 within any selected seat-receiving region 104, as discussed herein. Alternatively, electrical distribution system 150 may comprise an electrical conduit 152 and a plurality of track electrical contacts 154 for fewer than all of, and optionally one of, the plurality of seat tracks 106.

As mentioned, seat track assembly 102 may be configured to couple to a plurality of seat modules 200 and secure or support the plurality of seat modules 200 in a desired arrangement or pattern. In such examples, each seat module 200 may be coupled to seat track assembly 102 in a respective seat-receiving region 104, as discussed herein. In some examples, seating system 100 comprises a plurality of seat track assemblies 102. Seat track assemblies 102 may be distributed about cabin 14 in a plurality of respective regions. Each seat track assembly 102 may be configured to couple to a respective plurality of seat modules 200 and may arrange seat modules 200 in the same or a different pattern. With this in mind, each seat track assembly 102 may include one or more of the same or one or more different features as one another, such as to support seat modules 200 in a desired arrangement. For example, seat track assemblies 102 may include the same or a different number of seat tracks 106. For examples in which seating system 100 comprises a plurality of seat track assemblies 102, at least some seat track assemblies 102 may be spaced apart from one another along a span of cabin 14 (i.e., normal to longitudinal axis 22) and/or at least some seat track assemblies 102 may occupy different longitudinal portions of cabin 14.

For examples in which seating system 100 comprises a plurality of seat modules 200, each seat module 200 may include the same or a different configuration as other seat modules 200. For example, seating system 100 may comprise a first plurality of seat modules 200 that are configured to couple with a first seat track assembly 102 and that include at least substantially the same configuration as one another (i.e., same number of passenger seats 30, base couplers 202, etc.), and a second plurality of seat modules 200 that are configured to couple with a second seat track assembly 102 and that may include at least substantially the same configuration as one another, but this configuration may be the same as or different from that of the first plurality of seat modules 200. As an example, the first plurality of seat modules 200 may be for a first class section of cabin 14 while the second plurality of seat modules 200 may be for an economy section of cabin 14.

Figure 7:
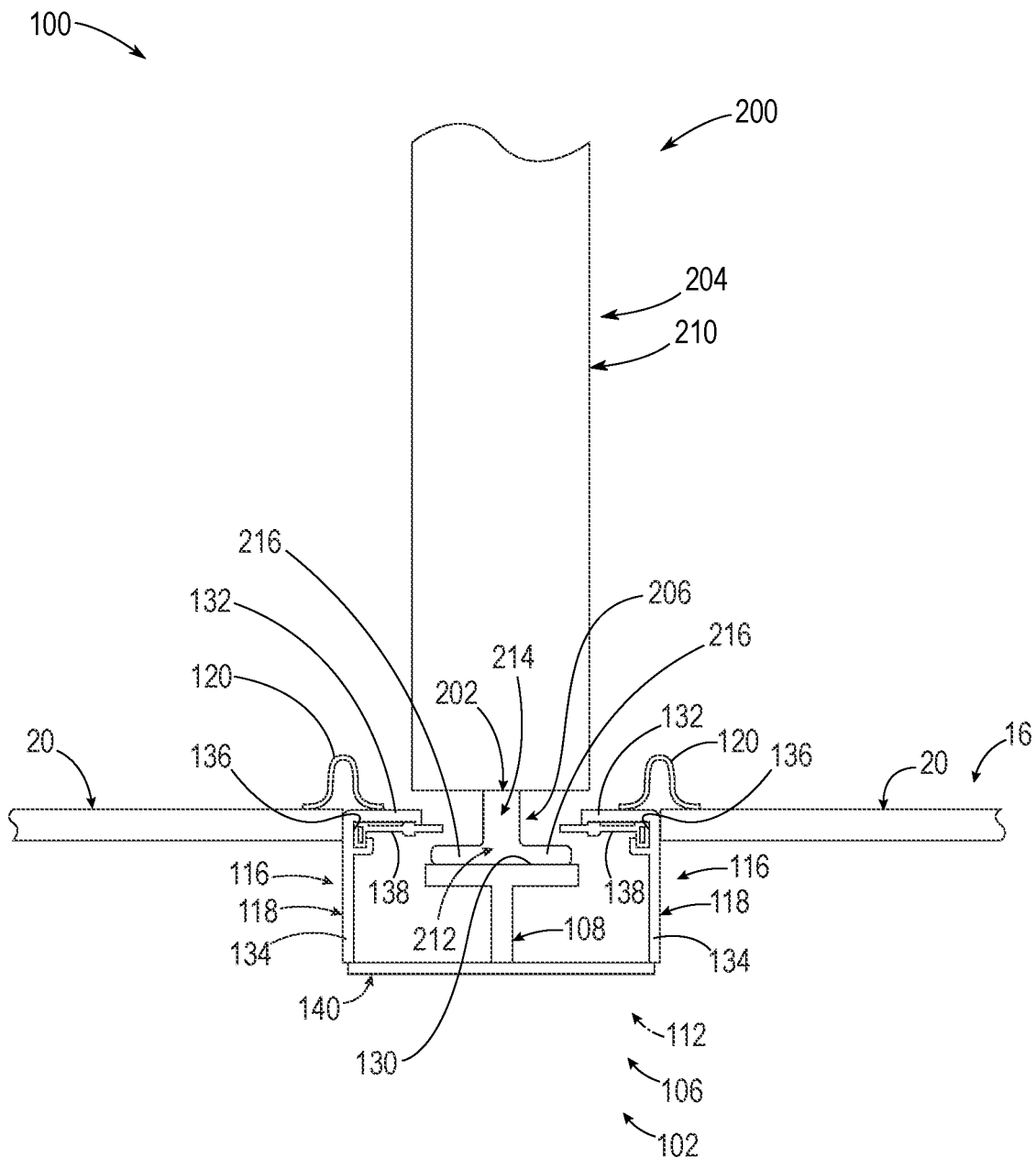
FIG. 7 is partial view illustrating an example of a base coupler of a seat module of seating systems disengaged from a seat track of seating systems according to the present disclosure.
Figure 8:
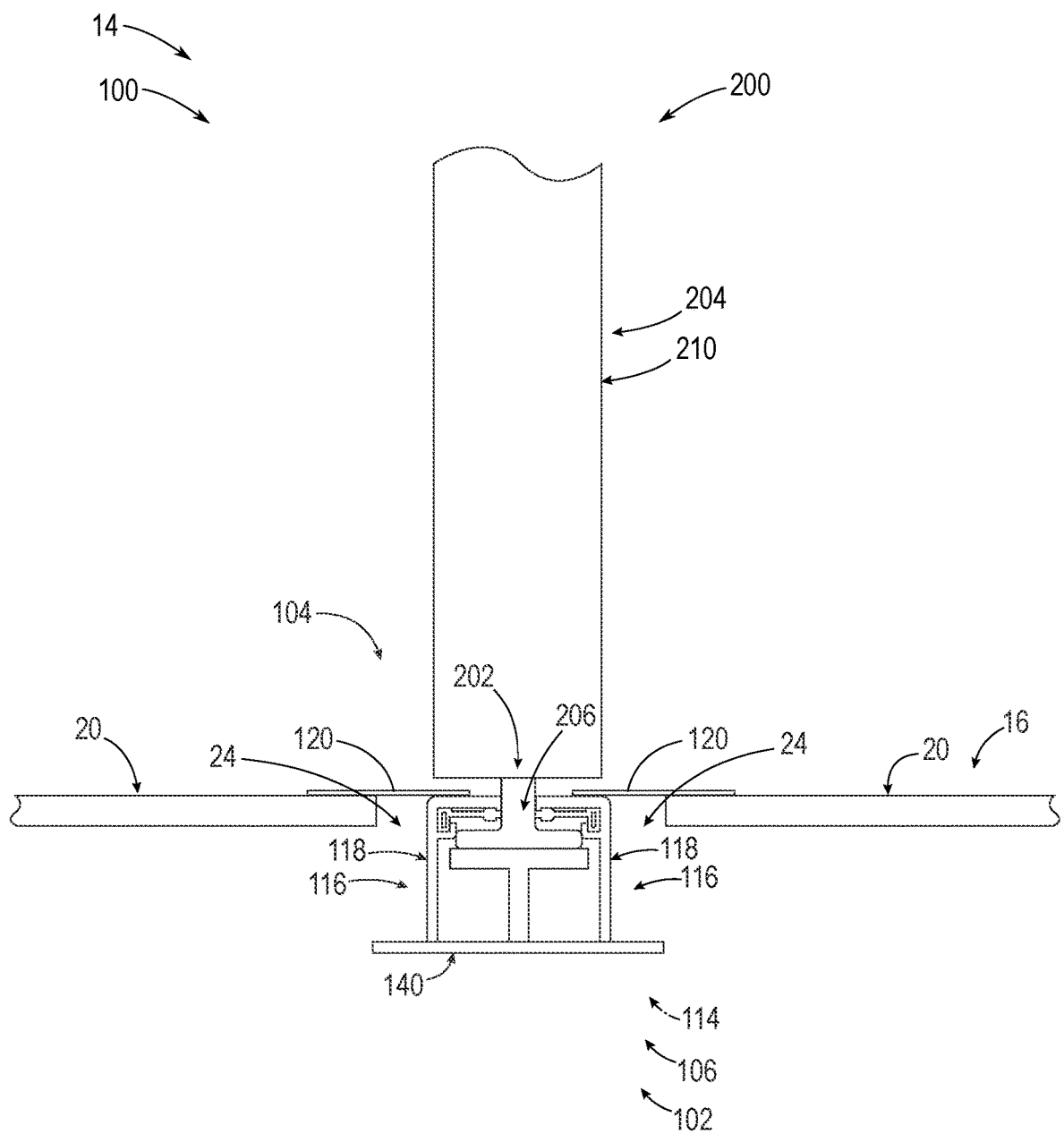
FIG. 8 is a partial view illustrating an example of the base coupler of the seat module engaged with the seat track according to the present disclosure.
Figure 9:
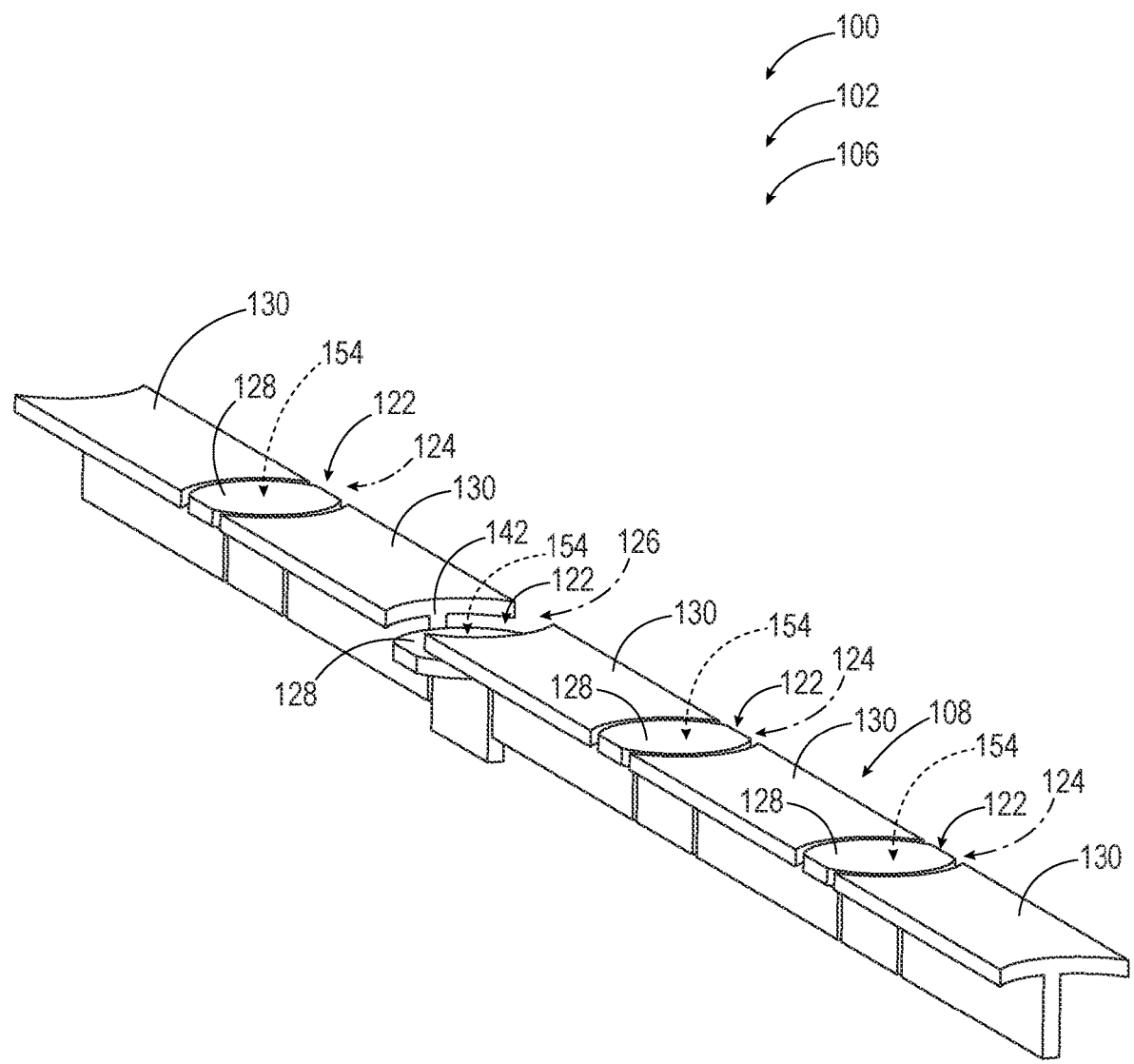
FIG. 9 is an isometric view illustrating an example of a seat rail of a seat track of seating systems, according to the present disclosure.

Turning now to FIGS. 7-9, illustrative non-exclusive examples of base couplers 202 of seat modules 200 and seat tracks 106 of seat track assemblies 102 according to the present disclosure are shown. Where appropriate, the reference numerals from the schematic illustrations of FIGS. 1-6 are used to designate corresponding parts in FIGS. 7-9; however, the examples of FIGS. 7-9 are non-exclusive and do not limit seating systems 100 to the illustrated embodiments of FIGS. 7-9. That is, seating systems 100 are not limited to the specific embodiments of FIGS. 7-9, and seating systems 100 may incorporate any number of the various aspects, configurations, characteristics, properties, etc. that are illustrated in and discussed with reference to the schematic representations of FIGS. 1-6 and/or the embodiments of FIGS. 7-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 7-9; however, it is within the scope of the present disclosure that the previously discussed features, variants, etc. may be utilized with the examples of FIGS. 7-9.

FIGS. 7-8 are cross-sectional views taken in a plane normal to the length of seat track 106 and through seat track 106 and a portion of seat module 200. FIG. 7 illustrates seat module 200 decoupled from seat track 106, and FIG. 8 shows seat module 200 coupled to seat track 106. With reference to FIGS. 7-8, seat module 200 includes seat support structure 204, which includes a leg 210 to which base coupler 202 is attached. Base coupler 202 includes bearing foot 206, which includes a terminal flange 212 and an upright web 214 that interconnects terminal flange 212 to leg 210. Terminal flange 212 comprises a pair of ledges 216 that extend outwardly from and traverse to upright web 214.

Seat track 106 comprises seat rail 108 and pair of brackets 116 positioned on either side of seat rail 108 to define the lateral sides 118 of seat track 106. Each bracket 116 comprises transverse wall 132 and upright wall 134 that is joined with and extends at least substantially normal to transverse wall 132. Each bracket 116 further comprises a closeout brush 138 that is coupled to an interior angle 136 between transverse wall 132 and upright wall 134 and that extends substantially parallel to transverse wall 132. Seat track 106 also comprises a bracket guide 140 to which brackets 116 are slidingly coupled and that is configured to guide brackets 116 between the releasing configuration 112 of FIG. 7 and the engaging configuration 114 of FIG. 8.

A first floor panel 20 of cabin floor 16 is positioned adjacent to a first of the pair of brackets 116, and a second floor panel 20 is positioned adjacent to a second of the pair of brackets 116. In these examples, brackets 116 are configured to translate laterally from releasing configuration 112 to engaging configuration 114. As shown in FIG. 8, floor panels 20 are spaced apart from brackets 116 such that a gap 24 exists between each bracket 116 and the corresponding floor panel 20. Seat track 106 further comprises a pair of flexible guards 120 that are configured to cover gaps 24. More specifically, a first flexible guard 120 is coupled to and extends between the first floor panel 20 and an upper surface of the transverse wall 132 of the first bracket 116, and a second flexible guard 120 is coupled to and extends between the second floor panel 20 and an upper surface of the transverse wall 132 of the second bracket 116. Flexible guards 120 are expanded when brackets 116 are in the engaged configuration 114 and cover gaps 24. Flexible guards 120 also are configured to deform to allow brackets 116 to move into the releasing configuration 112, as shown in FIG. 7.

In releasing configuration 112, brackets 116 also are moved out of engagement with bearing foot 206 of base coupler 202 to permit base coupler 202 to move into and out of engagement with seat rail 108. In engaged configuration 114, bearing foot 206 of base coupler 202 is seated on bearing surface 130 of seat rail 108, and the transverse wall 132 of each bracket 116 is in engagement with upright web 214. Closeout brushes 138 also contact upright web 214 and may do so to prevent dust or debris from falling into seat track 106. Brackets 116 also may engage ledges 216 of terminal flange 212 such as to prevent vertical displacement of base coupler 202 from seat rail 108.

As mentioned, in some examples, brackets 116 are configured to be maintained in engaged configuration 114 without base coupler 202 present in the respective seat-receiving region 104 and operate as a closeout mechanism, shielding seat rail 108 from the interior space of cabin 14. In the specific examples of FIGS. 7-8, closeout brushes 138 of the pair of brackets 116 are configured to abut or interleave with one another when brackets 116 are in engaged configuration 114 without base coupler 202 present, thereby forming a closeout between brackets 116 that covers seat rail 108.

FIG. 9 is an isometric view illustrating a more specific example of a portion of a seat rail 108 of seat track 106, according to the present disclosure. As shown, seat rail 108 comprises a plurality of bearing surfaces 130 and a plurality of recessing plungers 122. Each recessing plunger 122 comprises a platform surface 128 that is positioned between, and separates, adjacent bearing surfaces 130. Three of the four recessing plungers 122 shown in FIG. 9 are in nominal configuration 124, with the platform surfaces thereof being flush with adjacent bearing surfaces 130. One of the recessing plungers 122 is in recessed configuration 126, with the platform surface 128 thereof being recessed relative to, or positioned beneath, the adjacent bearing surfaces 130. Each recessing plunger 122 comprises interior sidewalls 142 along which platform surface 128 translates between nominal configuration 124 and recessed configuration 126. Interior sidewalls 142 are exposed when recessing plunger 122 is in recessed configuration 126. As mentioned, in some examples, interior sidewalls 142 are configured to engage base protrusion 208 of base coupler 202 to secure base coupler 202 to the respective seat-receiving region 104. In some examples, a respective track electrical contact 154 is disposed along each platform surface 128, as discussed herein.

Figure 10:
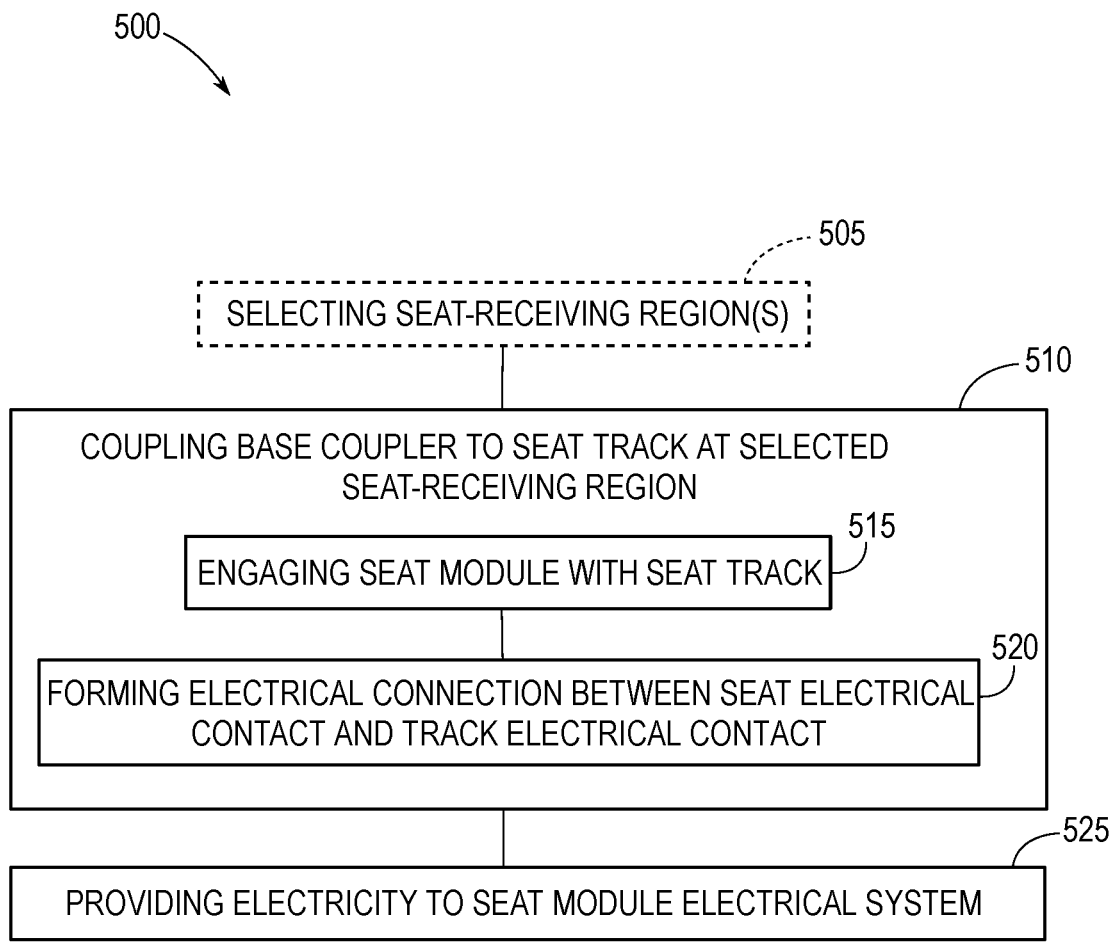
FIG. 10 is a flowchart schematically representing examples of methods according to the present disclosure.

FIG. 10 schematically provides a flowchart that represents illustrative, non-exclusive examples of methods of arranging seating systems 100 according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Each step or portion of methods 500 may be performed utilizing seating systems 100, cabins 14, and/or aircraft 10 and/or the features, functions, and/or portions thereof that are illustrated and discussed herein with reference to FIGS. 1-9. Likewise, any of the features, functions, and/or structures of seating systems 100, cabins 14, and/or aircraft 10 discussed herein with reference to FIG. 10 may be included in and/or utilized in the examples of FIGS. 1-9 without departing from the scope of the present disclosure.

Methods 500 comprise arranging a seating system 100 for a cabin 14 of an aircraft 10. As discussed herein, the seating system 100 comprises a seat module 200 and a seat track assembly 102 defining a plurality of seat-receiving regions 104, each being configured to couple to the seat module 200. As shown in FIG. 10, methods 500 comprise coupling 510 a base coupler of the seat module to a seat track of the seat assembly at a selected seat receiving region. The coupling 510 comprises engaging 515 the seat module with the seat track, and forming 520 an electrical connection between a seat electrical contact of the seat module and a track electrical contact of the track assembly. Methods further comprise providing 525 electricity to a seat module electrical system. In some examples, methods 500 comprise selecting 505 seat-receiving region(s).

In some examples, methods 500 comprise selecting 505 a seat-receiving region 104 from among the plurality of seat-receiving regions 104 to which the seat module 200 is to be coupled. When included in methods 500, the selecting 505 is based on any suitable criteria. In some examples, the selecting 505 is based on a desired location of seating module 200 within cabin 14 and/or a configuration of seating module 200 (e.g., number of passenger seats 30 and/or number or placement of base couplers 202 comprised in seat module 200). As mentioned, in some examples, seating system 100 comprises a plurality of seat track assemblies 102, and the selecting 505 comprises selecting an appropriate seat track assembly 102 for seat module 200. As a more specific example, seat module 200 may be configured for a specific section of cabin 14 (e.g., first class or economy class) and the selecting 505 comprises selecting the appropriate seat track assembly 102 within the appropriate section of cabin 14. In some examples, methods 500 comprise arranging a plurality of seat modules 200. In such examples, the selecting 505 comprises selecting a selected seat-receiving region 104 for each seat module 200 of the plurality of seating modules 200. In some examples, the selecting 505 comprises selecting a desired arrangement of the seat modules 200 and/or selecting a grid in which the seat modules 200 are to be coupled to the seat track assembly(s) 102. When comprised in methods 500, the selecting 505 may be performed prior to coupling 510 and/or providing 525.

As shown in FIG. 10, methods 500 comprise coupling 510, at a selected seat receiving region, a base coupler of the seat module with a seat track of the seat track assembly. In some examples, the seat track assembly 102 comprises a plurality of seat tracks 106 and the seat module 200 comprises a corresponding plurality of base couplers 202. In such examples, the coupling 510 comprises coupling each base coupler 202 of the seat module 200 to the respective seat track 106, in which case, the coupling 510 may be performed in at least substantially the same or in a different manner with respect to each base coupler 202 and the respective seat track 106. For examples in which methods 500 comprise the selecting 505, the selected seat-receiving region 104 is the seat-receiving region 104 selected at 505. For some examples in which methods 500 comprise arranging a plurality of seating modules 200, the coupling 510 comprises coupling each seating module 200 to the seat track assembly 102, or a respective seat track assembly 102, at the respective seat-receiving region 104.

The coupling 510 comprises engaging 515 the seat module with the seat track at the selected seat-receiving region. In some examples, the engaging 515 comprises securing the seat module 200 to the seat track 106 at the selected seat-receiving region 104. In some examples, the engaging 515 comprises engaging a respective engaging mechanism 110 of the selected seat-receiving region 104 with the base coupler 202 of the seat module 200. In some examples, the engaging 515 comprises transitioning the engaging mechanism 110 from a releasing configuration 112 to an engaging configuration 114, as discussed herein. In some examples, the seat track 106 comprises a seat rail 108 coupled to a sub-floor support structure 18 of the cabin 14, and the engaging 515 comprises supporting the base coupler 202 on the seat rail 108. In some examples, the engaging mechanism 110 comprises a pair of brackets 116, and the engaging 515 comprises engaging the pair of brackets 116 with the base coupler 202, which may include securing the base coupler 202 to the seat track 106, as discussed herein.

In some examples, the engaging 515 comprises engaging a base protrusion 208 of the base coupler 202 with a recessing plunger 122 that is comprised in the seat track 106 and positioned within the selected seat-receiving region 104, as discussed herein. In some such examples, the engaging 515 comprises engaging the base protrusion 208 with a platform surface 128 of the recessing plunger 122 and/or transitioning the recessing plunger 122 from a nominal configuration 124 to a recessed configuration 126, as discussed herein. In some examples, the engaging 515 comprises indexing the seat module 200 to or within the selected seat-receiving region 104, as discussed herein. In some such examples, the engaging the base protrusion 208 with the recessing plunger 122 comprises the indexing.

The coupling 510 further comprises forming 520 an electrical connection between a seat electrical contact of a seat module electrical system of the seat module and a track electrical contact that is disposed along the seat track in the selected seat-receiving region and comprised in an electrical distribution system of the seating system. In some examples, the track electrical contact 154 is connected to an electrical conduit 152 of the electrical distribution system 150. In other examples, the coupling 510 comprises electrically connecting the track electrical contact 154 and the electrical conduit 152, as discussed herein. In either examples, the track electrical contact 154 is in electrical connection with the electrical conduit 152 subsequent to, or a as a result of, the coupling 510. For examples in which seat track assembly 102 comprises a plurality of seat tracks 106 and seat module 200 comprises a corresponding plurality of base couplers 202, the forming 520 may be performed respective to each base coupler 202 and seat track 106 or the forming may be performed respective to at least one of, but fewer than all of, the base couplers 202 and seat tracks 106, as discussed herein.

The forming 520 may comprise forming an electrical data connection and/or an electrical power connection between the track electrical contact 154 and the seat electrical contact 252. In some examples, the forming 520 comprises forming an electrical data connection between a track electrical data contact 162 of the track electrical contact 154 and a seat electrical data contact 262 of the seat electrical contact 252, as discussed herein. Additionally or alternatively, the forming 520 comprises forming an electrical power connection between a track electrical power contact 158 of the track electrical contact 154 and a seat electrical power contact 258 of the seat electrical contact 252, as discussed herein. Likewise, coupling 510 may comprise forming an electrical data connection and/or an electrical power connection between the track electrical contact 154 and the electrical conduit 152.

The forming 520 may be performed as a portion of, as a result of, automatically with, and/or at least substantially simultaneously with the engaging 515. In some examples, the track electrical contact 154 is disposed along the seat rail 108, the seat electrical contact 252 is disposed along the base coupler 202, and the supporting the base coupler 202 on the seat rail 108 comprises the forming 520. In some examples, the track electrical contact 154 is disposed along the platform surface 128 of the recessing plunger 122 within the selected seat-receiving region 104, and the seat electrical contact 252 is disposed along the base protrusion 208 of the base coupler 202. In some such examples, the engaging 515 the base protrusion 208 with the platform surface 128 comprises the forming 520. In some examples, the engaging the base protrusion 208 with the platform surface 128 comprises the electrically connecting the track electrical contact 154 and the electrical conduit 152. More specifically, in some examples, the transitioning the recessing plunger 122 from the nominal configuration 124 to the recessed configuration 126 comprises the electrically connecting, as discussed herein.

The forming is performed with any suitable sequence or timing within methods 500, such as substantially simultaneously with the engaging 515 and/or prior to the providing 525.

Methods 500 further comprise providing 525, by the electrical distribution system 150, electricity to the seat module electrical system 250 via the electrical connection between the track electrical contact 154 and the seat electrical contact 252. For some examples in which the coupling 510 comprises coupling a plurality of seat modules 200 to the seat track 106, the providing 525 comprises providing electrical power to at least some of, and optionally each of, the seat modules 200.

The providing 525 may comprise providing electrical data and/or electrical power to the seat module electrical system 250. As more specific examples, the providing 525 may comprise providing electrical data and/or electrical power to an entertainment device 264, an audio device 266, and/or an external device electrical port 268 of seat module electrical system 250.

In some examples, methods 500 further comprise decoupling the seat module from the seat track assembly 102 and coupling 510 the seat module 200 to a new seat-receiving region 104 that is different from the selected seat-receiving region 104. In other words, methods 500 may include relocating the seat module 200. In some such examples, methods 500 comprise providing electricity to the seat module 200 at the new seat-receiving region 104. For some examples in which methods 500 comprise coupling 510 a plurality of seat modules 200 to the seat track assembly 102, the decoupling comprises decoupling at least some of, and optionally each of, the plurality of seat modules 200 from the respective seat-receiving regions 104 and coupling 510 the seat modules 200 to a plurality of new respective seat-receiving regions 104 that are different from the respective seat-receiving regions 104. In other words, methods 500 may comprise rearranging the plurality of seat modules 200 or coupling 510 the plurality of seat modules 200 to the seat track assembly 102 in a new arrangement. For example, the rearranging may comprise changing a seat pitch between adjacent seat modules 200 or changing a class of the plurality of seat modules 200, as discussed herein. In some such examples, methods 500 further comprise providing electricity to the plurality of seat modules 200 in the plurality of new respective seat-receiving regions 104.

Illustrative, non-exclusive examples of inventive subject matter according to the present disclosure are described in the following enumerated paragraphs:

A. A seating system (100) for a cabin (14) of an aircraft (10), the seating system (100) comprising:
  a seat module (200); and
  a seat track assembly (102) defining a plurality of seat-receiving regions (104), each of the seat-receiving regions (104) being configured to couple to the seat module (200), wherein the seat track assembly (102) comprises:
    a seat track (106) configured to extend along a cabin floor (16) of the cabin (14) and to selectively secure the seat module (200) to any seat-receiving region (104) of the plurality of seat-receiving regions (104);
    an electrical distribution system (150) comprising an electrical conduit (152) and a plurality of track electrical contacts (154), wherein the plurality of track electrical contacts (154) are respectively disposed along the seat track (106) in the plurality of seat-receiving regions (104), and wherein the plurality of track electrical contacts (154) are configured for electrical connection to or are in electrical connection with the electrical conduit (152);
  wherein the seat module (200) comprises:
    a base coupler (202) configured to couple with the seat track (106) at any selected seat-receiving region (104) of the plurality of seat-receiving regions (104); and
    a seat module electrical system (250) comprising a seat electrical contact (252) configured to electrically connect to any selected track electrical contact (154) of the plurality of track electrical contacts (154);
  wherein the base coupler (202) and seat track (106) are configured to position the seat electrical contact (252) of the seat module (200) in electrical connection with a respective track electrical contact (154) of a selected seat-receiving region (104) of the plurality of seat-receiving regions (104) when the base coupler (202) is coupled with the seat track (106) at the selected seat-receiving region; and
  wherein the electrical distribution system (150) is configured to provide electricity to the seat module electrical system (250) when the seat electrical contact (252) is in electrical connection with any track electrical contact (154) of the plurality of track electrical contacts (154).

A1. The seating system (100) of paragraph A, wherein the seat electrical contact (252) of the seat module (200) is disposed along the base coupler (202) of the seat module (200).

A2. The seating system (100) of any of paragraphs A-A1, wherein the plurality of track electrical contacts (154) are integral with the seat track (106).

A3. The seating system (100) of any of paragraphs A-A2, wherein the seat module (200) further comprises at least one passenger seat (30) and a seat support structure (204) interconnecting the at least one passenger seat (30) and the base coupler (202) and configured to support the at least one passenger seat (30) on the base coupler (202).

A4. The seating system (100) of any of paragraphs A-A3, wherein the seat track (106) extends at least substantially parallel to a longitudinal axis (22) of the cabin (14).

A5. The seating system (100) of any of paragraphs A-A4, wherein the seat track (106) comprises a seat rail (108) that is operatively attached to a sub-floor support structure (18) of the cabin (14), wherein the seat rail (108) is configured to engage the base coupler (202) of the seat module (200) and support the seat module (200) on the sub-floor support structure (18) of the cabin (14), and wherein the plurality of track electrical contacts (154) are disposed along the seat rail (108) of the seat track (106).

A6. The seating system (100) of any of paragraphs A-A5, wherein the seat track (106) further comprises a plurality of engaging mechanisms (110) respectively disposed along the seat track (106) in the plurality of seat-receiving regions (104), wherein each engaging mechanism (110) is configured to interlock with the base coupler (202) of the seat module (200) and optionally engage the base coupler (202) with a/the seat rail (108).

A6.1 The seating system of paragraph A6, wherein each engaging mechanism (110) is configured to operatively secure the seat module (200) to the seat track (106) in the respective seat-receiving region (104) of the plurality of seat-receiving regions (104).

A7. The seating system (100) of any of paragraphs A6-A6.1, wherein each engaging mechanism (110) of the plurality of engaging mechanisms (110) is configured to secure the seat electrical contact (252) of the seat module (200) in electrical connection with the respective track electrical contact (154) of the respective seat-receiving region (104).

A8. The seating system (100) of any of paragraphs A6-A7, wherein each engaging mechanism (110) of the plurality of engaging mechanisms (110) is configured to selectively transition between a releasing configuration (112), in which the engaging mechanism (110) permits the base coupler (202) of the seat module (200) to move into and out of engagement with the seat track (106), and an engaging configuration (114) in which the engaging mechanism (110) is configured to interlock with the base coupler (202) and optionally secure the base coupler (202) to the seat track (106).

A9. The seating system (100) of paragraph A8, wherein each engaging mechanism (110) comprises a pair of brackets (116) operatively coupled to a/the seat rail (108) and configured to selectively interlock with the base coupler (202) of the seat module (200), and wherein the brackets of each pair of brackets (116) are configured to move relative to the seat rail (108) between the releasing configuration (112) and the engaging configuration (114).

A10. The seating system (100) of paragraph A9, wherein the base coupler (202) of the seat module (200) comprises a bearing foot (206) configured to engage a bearing surface (130) of the seat rail (108), and wherein the pair of brackets (116) of each engaging mechanism (110) are configured to secure the bearing foot (206) of the base coupler (202) in engagement with the seat rail (108) when the engaging mechanism (110) is in the engaging configuration (114).

A11. The seating system (100) of any of paragraphs A9-A10, wherein the cabin (14) comprises a first floor panel (20) positioned adjacent to a first lateral side (118) of the seat track (106) and a second floor panel (20) positioned adjacent to a second lateral side (118) of the seat track (106), wherein each pair of brackets (116) comprises a first bracket (116) defining a corresponding portion of the first lateral side (118) of the seat track (106) along the respective seat-receiving region (104) and a second bracket (116) defining a corresponding portion of the second lateral side (118) of the seat track (106) along the respective seat-receiving region (104), wherein the first bracket (116) is configured to move laterally relative to the first floor panel (20) between the engaging configuration (114) and the releasing configuration (112), and wherein the second bracket (116) is configured to move laterally relative to the second floor panel (20) between the engaging configuration (114) and the releasing configuration (112).

A12. The seating system (100) of paragraph A11, further comprising a plurality of flexible guards (120) comprising a first subset of flexible guards (120) and a second subset of flexible guards (120), wherein the first subset of flexible guards (120) are respectively coupled to and extend between the first brackets (116) of the plurality of engaging mechanisms (110) and the first floor panel (20), and wherein the second subset of flexible guards (120) are respectively coupled to and extend between the second brackets (116) of the plurality of engaging mechanisms (110) and the second floor panel (20).

A13. The seating system (100) of paragraph A12, wherein the plurality of flexible guards (120) are configured to permit the pairs of brackets (116) of the plurality of engaging mechanisms (110) to move laterally relative to the first floor panel (20) and the second floor panel (20), wherein each flexible guard (120) of the first subset of flexible guards (120) is configured to cover a corresponding gap (24) between the first floor panel (20) and the corresponding first bracket (116) when the corresponding first bracket (116) is in either of the engaging configuration (114) and the releasing configuration (112), and wherein each flexible guard (120) of the second subset of flexible guards (120) is configured to cover a corresponding gap (24) between the second floor panel (20) and the corresponding second bracket (116) when the corresponding second bracket (116) is in either of the engaging configuration (114) and releasing configuration (112).

A14. The seating system (100) of any of paragraphs A-A13, wherein the base coupler (202) of the seat module (200) is configured to position the respective track electrical contact (154) of the selected seat-receiving region (104) in electrical connection with the electrical conduit (152) when the base coupler (202) is coupled with the selected seat-receiving region (104), and wherein the base coupler (202) is configured to disconnect the respective track electrical contact (154) from electrical connection with the electrical conduit (152) when the base coupler (202) is disengaged from the selected seat-receiving region (104).

A15. The seating system (100) of any of paragraphs A-A14, wherein the seat track (106) further comprises a plurality of recessing plungers (122) disposed along a/the seat rail (108) of the seat track (106) and each being respectively positioned within a seat-receiving region (104) of the plurality of seat-receiving regions (104), wherein each recessing plunger (122) of the plurality of recessing plungers (122) is configured to selectively transition between a nominal configuration (124) and a recessed configuration (126), wherein in the recessed configuration (126), a platform surface (128) of the recessing plunger (122) is recessed relative to the platform surface (128) in the nominal configuration (124), wherein the base coupler (202) of the seat module (200) comprises a base protrusion (208) that is configured to engage the platform surface (128) of each recessing plunger (122) and maintain the recessing plunger (122) in the recessed configuration (126) when the base coupler (202) of the seat module (200) is coupled to the respective seat-receiving region (104).

A16. The seating system (100) of paragraph A15, wherein each recessing plunger (122) of the plurality of recessing plungers (122) is biased towards the nominal configuration (124).

A17. The seating system (100) of any of paragraphs A15-A16, wherein each recessing plunger (122) is configured to engage the base protrusion (208) of the seat module (200) in the recessed configuration (126) to secure the seat module (200) against longitudinal displacement and/or lateral displacement from the respective seat-receiving region (104).

A18. The seating system (100) of any of paragraphs A15-A17, wherein each recessing plunger (122) of the plurality of recessing plungers (122) is configured to index the seat module (200) to the respective seat-receiving region (104).

A19. The seating system (100) of any of paragraphs A15-A18, wherein the plurality of track electrical contacts (154) are respectively disposed along the platform surfaces (128) of the plurality of recessing plungers (122).

A20. The seating system (100) of paragraph A19, wherein the seat electrical contact (252) of the seat module (200) is disposed along the base protrusion (208) such that, when the base protrusion (208) engages the platform surface (128) of any selected recessing plunger (122) of the plurality of recessing plungers (122), the seat electrical contact (252) electrically connects with a corresponding track electrical contact (154) of the plurality of track electrical contacts (154).

A21. The seating system (100) of any of paragraphs A15-A20, wherein each recessing plunger (122) of the plurality of recessing plungers (122) is configured to position a/the corresponding track electrical contact (154) of the plurality of track electrical contacts (154) in electrical connection with the electrical conduit (152) when the recessing plunger (122) is in the recessed configuration (126), and wherein each recessing plunger (122) of the plurality of recessed plungers is configured to disconnect the corresponding track electrical contact (154) of the plurality of track electrical contacts (154) from electrical connection with the electrical conduit (152) when the recessing plunger (122) is in the nominal configuration (124).

A22. The seating system (100) of any of paragraphs A-A21, wherein the seat track (106) is a first seat track (106) of a plurality of seat tracks (106) comprised in the seat track assembly (102), wherein the base coupler (202) is a first base coupler (202) of a plurality of base couplers (202) comprised in the seat module (200), and wherein the plurality of seat tracks (106) and the plurality of base couplers (202) are configured to couple with one another at any seat-receiving region (104) of the plurality of seat-receiving regions (104).

A23. The seating system (100) of paragraph A22, wherein the plurality of seat tracks (106) further comprises a second seat track (106) that extends at least substantially parallel to, and spaced apart from, the first seat track (106), wherein the plurality of base couplers (202) further comprises a second base coupler (202), wherein the first base coupler (202) and the first seat track (106) are configured to couple with one another, and wherein the second base coupler (202) and the second seat track (106) are configured to couple with one another.

A24. The seating system (100) of any of paragraphs A22-A23, wherein the plurality of base couplers (202) are supported by a/the seat support structure (204) of the seat module (200).

A25. The seating system (100) of paragraph A24, wherein the seat support structure (204) comprises a plurality of legs (210), wherein the plurality of base couplers (202) are respectively connected to the plurality of legs (210).

A26. The seating system (100) of any of paragraphs A-A25, wherein the electrical conduit (152) comprises an electrical power conduit (156) and the electrical distribution system (150) is configured to distribute electrical power through the electrical power conduit (156), wherein each track electrical contact (154) of the plurality of track electrical contacts (154) comprises a track electrical power contact (158), wherein the seat electrical contact (252) comprises a seat electrical power contact (258), and wherein the electrical distribution system (150) is configured to provide electrical power to the seat module electrical system (250) when the seat electrical power contact (258) is in electrical connection with the track electrical power contact (158) of any track electrical contact (154).

A27. The seating system (100) of any of paragraphs A-A26, wherein the electrical conduit (152) comprises an electrical data conduit (160) and the electrical distribution system (150) is configured to distribute electrical data through the electrical data conduit (160), wherein each track electrical contact (154) of the plurality of track electrical contacts (154) comprises a track electrical data contact (162), wherein the seat electrical contact (252) comprises a seat electrical data contact (262), and wherein the electrical distribution system (150) is configured to provide electrical data to the seat module electrical system (250) when the seat electrical data contact (262) is in electrical connection with the track electrical data contact (162) of any track electrical contact (154).

A28. The seating system (100) of any of paragraphs A-A27, further comprising a plurality of the seat modules (200).

A29. The seating system (100) of any of paragraphs A-A28, further comprising a plurality of the seat track assemblies (102), and wherein each seat track assembly (102) defines a respective plurality of seat-receiving regions (104) configured to couple to the seat module (200).

A30. The use of the seating system (100) of any of paragraphs A-A29, to seat at least one passenger in the aircraft.

B. An aircraft comprising a cabin (14) and the seating system (100) of any of paragraphs A-A30 positioned within the interior of the cabin (14).

C. A method of arranging a seating system (100) for a cabin (14) of an aircraft (10), wherein the seating system (100) comprises a seat module (200) and a seat track assembly (102) defining a plurality of seat-receiving regions (104), each being configured to couple to the seat module (200), the method comprising:

coupling, at a selected seat-receiving region (104) of the plurality of seat-receiving regions (104), a base coupler (202) of the seat module (200) and with a seat track (106) of seat track assembly (102), wherein the coupling comprises:

engaging the seat module (200) with the seat track (106) at the selected seat-receiving region (104);

forming an electrical connection between a seat electrical contact (252) of a seat module electrical system (250) comprised in the seat module (200) and a track electrical contact (154) disposed along the seat track (106) in the selected seat-receiving region (104), wherein the track electrical contact (154) is connected to an electrical conduit (152) of an electrical distribution system (150) or the coupling comprises electrically connecting the track electrical contact (154) to the electrical conduit (152); and providing, by the electrical distribution system (150), electricity to the seat module electrical system (250) via the electrical connection.

C1. The method of paragraph C, wherein the seat track (106) comprises a seat rail (108) coupled to a sub-floor support structure (18) of the cabin (14), wherein the track electrical contact (154) is disposed on the seat rail (108), wherein the coupling comprises supporting the base coupler (202) on the seat rail (108), and wherein the supporting comprises forming the electrical connection.

C2. The method of any of paragraphs C-C1, wherein the seat track (106) comprises a recessing plunger (122) in the selected seat-receiving region (104), and wherein the engaging comprises engaging a base protrusion (208) of the base coupler (202) of the seat module (200) with a platform surface (128) of the recessing plunger (122) and transitioning the recessing plunger (122) from a nominal configuration (124) to a recessed configuration (126).

C3. The method of paragraph C2, wherein the engaging comprises indexing the seat module (200) within the selected seat-receiving region (104).

C4. The method of any of paragraphs C-C3, wherein the track electrical contact (154) is disposed along a/the platform surface (128) of a/the recessing plunger (122), wherein the seat electrical contact (252) is disposed along a/the base protrusion (208) of the base coupler (202), and wherein the engaging the base protrusion (208) with the platform surface (128) comprises the forming the electrical connection.

C5. The method of any of paragraphs C-C4, wherein a/the transitioning comprises the electrically connecting the track electrical contact (154) with the electrical conduit (152).

C6. The method of any of paragraphs C-C5, wherein the forming comprises forming an electrical data connection between a track electrical data contact (162) of the track electrical contact (154) and a seat electrical data contact (262) of the seat electrical contact (252), and wherein the providing comprises providing electrical data to the seat module electrical system (250).

C7. The method of any of paragraphs C-C6, wherein the forming comprises forming an electrical power connection between a track electrical power contact (158) of the track electrical contact (154) and a seat electrical power contact (258) of the seat module (200), and wherein the providing comprises providing electrical power to the seat module electrical system (250).

C8. The method of any of paragraphs C-C7, wherein the seating system (100) comprises a plurality of the seat modules (200), wherein the method further comprises selecting a respective seat-receiving region (104) from the plurality of seat-receiving regions (104) for each seat module (200) of the plurality of seat modules (200), coupling each seat module (200) of the plurality of seat modules (200) to the respective seat-receiving region (104), and providing electricity to each seat module (200) of the plurality of seat modules (200).

C9. The method of any of paragraphs C-C8, wherein the seating system (100) is the seating system of any of paragraphs A-A30.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

Unless specifically defined otherwise, "at least substantially," as used herein when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A seating system for a cabin of an aircraft, the seating system comprising:
    a seat module; and
    a seat track assembly defining a plurality of seat-receiving regions, each of the seat-receiving regions being configured to couple to the seat module, wherein the seat track assembly comprises:
        a seat track configured to extend along a cabin floor of the cabin and to selectively secure the seat module to any seat-receiving region of the plurality of seat-receiving regions, wherein the cabin floor comprises a sub-floor support structure, wherein the seat track comprises a seat rail, wherein the seat rail extends away from the sub-floor support structure, and the seat rail comprises a seat rail-bearing surface arranged opposed to the sub-floor support structure;
        an electrical distribution system comprising an electrical conduit and a plurality of track electrical contacts, wherein the plurality of track electrical contacts are integrated into the seat rail-bearing surface in the plurality of seat-receiving regions, and wherein the plurality of track electrical contacts are configured for electrical connection to or are in electrical connection with the electrical conduit;
    wherein the seat module comprises:
        a base coupler configured to couple with the seat track at any selected seat-receiving region of the plurality of seat-receiving regions, wherein the base coupler comprises a contact surface configured to engage with the seat rail-bearing surface; and
        a seat module electrical system comprising a seat electrical contact integrated into the contact surface of the base coupler;
    wherein the contact surface of the base coupler and the seat rail-bearing surface of the seat track are configured to position the seat electrical contact integrated into the contact surface in electrical connection with a respective track electrical contact integrated into the seat rail-bearing surface when the seat rail-bearing surface and the contact surface are engaged and when the base coupler is coupled with the seat track at the selected seat-receiving region; and
    wherein the electrical distribution system is configured to provide electricity to the seat module electrical system when the seat electrical contact is in electrical connection with any track electrical contact of the plurality of track electrical contacts.

2. The seating system of claim 1, wherein the seat module comprises a seat, and wherein the contact surface and the seat electrical contact are disposed facing away from the seat.

3. The seating system of claim 2, wherein the seat rail-bearing surface forms a top surface of the seat rail, and wherein the base coupler extends away from the seat module and the contact surface of the base coupler forms a bottom surface of the base coupler.

4. The seating system of claim 1, wherein the seat module further comprises at least one passenger seat and a seat support structure interconnecting the at least one passenger seat and the base coupler and configured to support the at least one passenger seat on the base coupler.

5. The seating system of claim 3, wherein the seat rail is operatively attached to the sub-floor support structure of the cabin floor, wherein engagement of the seat rail-bearing surface and the contact surface supports the seat module on the sub-floor support structure of the cabin floor.

6. The seating system of claim 1, wherein the seat track further comprises a plurality of engaging mechanisms respectively disposed along the seat track in the plurality of seat-receiving regions, wherein each engaging mechanism is configured to interlock with the base coupler of the seat module and secure the seat electrical contact of the seat module in electrical connection with the respective track electrical contact of the respective seat-receiving region.

7. The seating system of claim 1, wherein the seat track further comprises a plurality of engaging mechanisms respectively disposed along the seat track in the plurality of seat-receiving regions, wherein each engaging mechanism of the plurality of engaging mechanisms is configured to selectively transition between a releasing configuration, in which the engaging mechanism permits the base coupler of the seat module to move into and out of engagement with the seat track, and an engaging configuration in which the engaging mechanism is configured to interlock with the base coupler and optionally secure the base coupler to the seat track.

8. The seating system of claim 7, wherein the seat rail is operatively attached to the sub-floor support structure of the cabin floor, wherein each engaging mechanism comprises a pair of brackets operatively coupled to the seat rail and configured to selectively interlock with the base coupler of the seat module, and wherein the brackets of each pair of brackets are arranged in gaps between floor panels of the cabin floor and configured to move laterally relative to the floor panels and the seat rail between the releasing configuration and the engaging configuration.

9. The seating system of claim 1, wherein the base coupler of the seat module is configured to position the respective track electrical contact of the selected seat-receiving region in electrical connection with the electrical conduit when the base coupler is coupled with the selected seat-receiving region, and wherein the base coupler is configured to disconnect the respective track electrical contact from electrical connection with the electrical conduit when the base coupler is disengaged from the selected seat-receiving region.

10. The seating system of claim 1, wherein the seat rail is operatively attached to the sub-floor support structure of the cabin floor and a plurality of recessing plungers disposed along the seat rail, wherein each recessing plunger of the plurality of recessing plungers is respectively positioned within a seat-receiving region of the plurality of seat-receiving regions, wherein each recessing plunger of the plurality of recessing plungers is configured to selectively transition between a nominal configuration and a recessed configuration, wherein in the recessed configuration, a platform surface of the recessing plunger is recessed relative to the platform surface in the nominal configuration, wherein the base coupler of the seat module comprises a base protrusion that is configured to engage the platform surface of each recessing plunger and maintain the recessing plunger in the recessed configuration when the base coupler of the seat module is coupled to the respective seat-receiving region, wherein the platform surface is aligned with the seat rail-bearing surface in the nominal configuration.

11. The seating system of claim 10, wherein each recessing plunger of the plurality of recessing plungers is configured to index the seat module to the respective seat-receiving region.

12. The seating system of claim 10, wherein the plurality of track electrical contacts are respectively disposed along the platform surfaces of the plurality of recessing plungers.

13. The seating system of claim 10, wherein each recessing plunger of the plurality of recessing plungers is configured to position a corresponding track electrical contact of the plurality of track electrical contacts in electrical connection with the electrical conduit when the recessing plunger is in the recessed configuration, and wherein each recessing plunger of the plurality of recessing plungers is configured to disconnect the corresponding track electrical contact of the plurality of track electrical contacts from electrical connection with the electrical conduit when the recessing plunger is in the nominal configuration.

14. The seating system of claim 1, further comprising a plurality of the seat modules.

15. A method of arranging a seating system for a cabin of an aircraft, wherein the seating system comprises a seat module and a seat track assembly defining a plurality of seat-receiving regions, each being configured to couple to the seat module, the method comprising:
  coupling, at a selected seat-receiving region of the plurality of seat-receiving regions, a contact surface of a base coupler of the seat module with a seat rail-bearing surface of a seat track of the seat track assembly, wherein the cabin comprises a sub-floor support structure, wherein the seat track comprises a seat rail, wherein the seat rail extends away from the sub-floor support structure, and the seat rail comprises the seat rail-bearing surface arranged opposed to the sub-floor support structure, wherein the coupling comprises:
    engaging the seat module with the seat track at the selected seat-receiving region;
    forming an electrical connection between a seat electrical contact integrated into the contact surface of the base coupler and a track electrical contact integrated into the seat rail-bearing surface in the selected seat-receiving region by engaging the contact surface of the base coupler with the seat rail-bearing surface, wherein the track electrical contact is connected to an electrical conduit of an electrical distribution system, or wherein the coupling comprises electrically connecting the track electrical contact to the electrical conduit; and
  providing, by the electrical distribution system, electricity to a seat module electrical system via the electrical connection.

16. The method of claim 15, wherein the seat rail is coupled to the sub-floor support structure of the cabin, wherein the coupling comprises supporting the base coupler on the seat rail, and wherein the supporting comprises forming the electrical connection.

17. The method of claim 15, wherein the seat track comprises a recessing plunger in the selected seat-receiving region, wherein the engaging comprises engaging a base protrusion of the base coupler of the seat module with a platform surface of the recessing plunger and transitioning the recessing plunger from a nominal configuration to a recessed configuration, wherein the track electrical contact is disposed along the platform surface of the recessing plunger, wherein the seat electrical contact is disposed along the base protrusion of the base coupler, and wherein the engaging the base protrusion with the platform surface comprises the forming of the electrical connection.

18. The method of claim 17, wherein the transitioning comprises the electrically connecting the track electrical contact with the electrical conduit.

19. The method of claim 15, wherein at least one of:
  (i) the forming comprises forming an electrical data connection between a track electrical data contact of the track electrical contact and a seat electrical data contact of the seat electrical contact, and the providing comprises providing electrical data to the seat module electrical system; and
  (ii) the forming comprises forming an electrical power connection between a track electrical power contact of the track electrical contact and a seat electrical power contact of the seat electrical contact, and the providing comprises providing electrical power to the seat module electrical system.

20. The method of claim 15, wherein the seating system comprises a plurality of the seat modules, wherein the method further comprises selecting a respective seat-receiving region from the plurality of seat-receiving regions for each seat module of the plurality of seat modules, and the coupling comprises coupling each seat module of the plurality of seat modules to the respective seat-receiving region, and providing electricity to each seat module of the plurality of seat modules.

* * * * *